(12) United States Patent
Shimizu

(10) Patent No.: US 11,862,400 B2
(45) Date of Patent: Jan. 2, 2024

(54) ELECTRONIC COMPONENT AND ELECTRONIC DEVICE

(71) Applicant: KABUSHIKI KAISHA TOSHIBA, Tokyo (JP)

(72) Inventor: Takahiro Shimizu, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/823,244

(22) Filed: Aug. 30, 2022

(65) Prior Publication Data
US 2023/0085659 A1    Mar. 23, 2023

(30) Foreign Application Priority Data

Sep. 17, 2021  (JP) .................................. 2021-152240
May 25, 2022  (JP) .................................. 2022-085162

(51) Int. Cl.
*H01G 4/228*    (2006.01)
*H01G 2/06*    (2006.01)

(52) U.S. Cl.
CPC ............... *H01G 4/228* (2013.01); *H01G 2/06* (2013.01)

(58) Field of Classification Search
None
See application file for complete search history.

(56) References Cited

U.S. PATENT DOCUMENTS

| 2001/0006450 A1* | 7/2001 | Kobayashi | H01G 4/228 361/306.3 |
| 2003/0084565 A1* | 5/2003 | Wang | H05K 3/308 29/827 |
| 2005/0061543 A1* | 3/2005 | Sagayanathan | H05K 7/12 174/260 |

FOREIGN PATENT DOCUMENTS

| JP | 59-48028 U | 3/1984 | |
| JP | 62-49614 A | 3/1987 | |
| JP | 62-199925 U | 12/1987 | |
| JP | 3-38617 U | 4/1991 | |
| JP | 4-83323 | 3/1992 | |
| JP | 05093031 A * | 4/1993 | ........... C07C 215/14 |

\* cited by examiner

*Primary Examiner* — Eric W Thomas
(74) *Attorney, Agent, or Firm* — Oblon, McClelland, Maier & Neustadt, L.L.P.

(57) ABSTRACT

According to one embodiment, an electronic component includes an element, a first lead, and a second lead. The element includes a first electrode and a second electrode. The first lead is electrically connected with the first electrode, and has a flattened cross section. The second lead is electrically connected with the second electrode. The first lead includes a first connection portion, a first bonding portion, and a first extension portion. The first connection portion is connected with the first electrode. The first bonding portion is configured to be bonded with a substrate. The first bonding portion extends in an extension direction perpendicular to a first counter direction. The first counter direction connects the first electrode and the second electrode. The first extension portion is located between the first connection portion and the first bonding portion. The first extension portion extends in the extension direction.

10 Claims, 19 Drawing Sheets

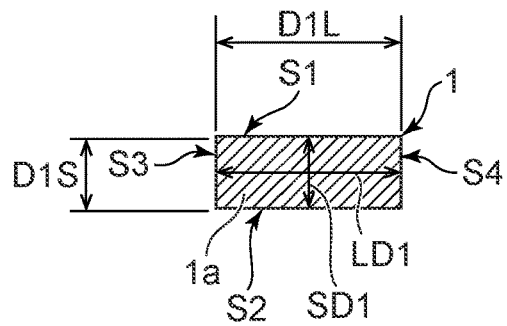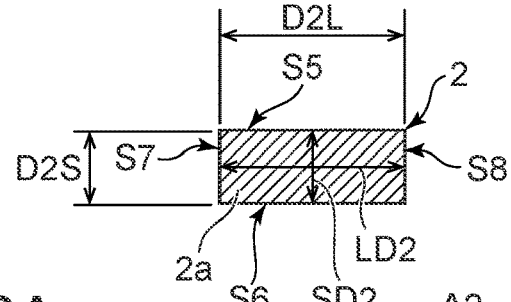
FIG. 2A
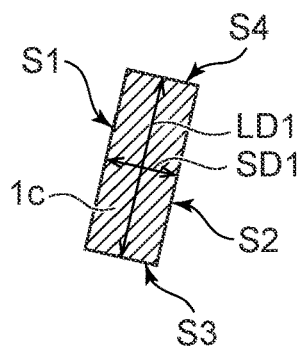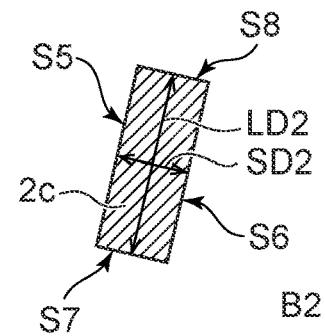
FIG. 2B
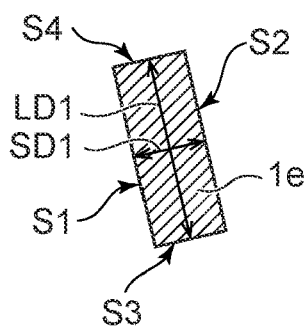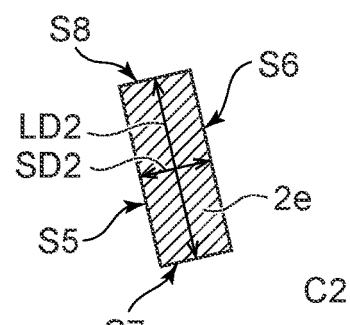
FIG. 2C
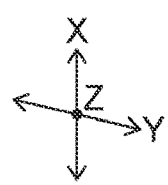

US 11,862,400 B2

ELECTRONIC COMPONENT AND ELECTRONIC DEVICE

CROSS-REFERENCE TO RELATED APPLICATIONS

This application is based upon and claims the benefit of priority from Japanese Patent Application No. 2021-152240, filed on Sep. 17, 2022; and Japanese Patent Application No. 2022-085162, filed on May 25, 2022; the entire contents of which are incorporated herein by reference.

FIELD

Embodiments described herein relate generally to an electronic component and an electronic device.

BACKGROUND

There is an electronic component that includes a pair of leads. High reliability of the electronic component is desirable.

BRIEF DESCRIPTION OF THE DRAWINGS

FIGS. 2A to 2C are cross-sectional views of the first and second leads;

DETAILED DESCRIPTION

Figure 1A:
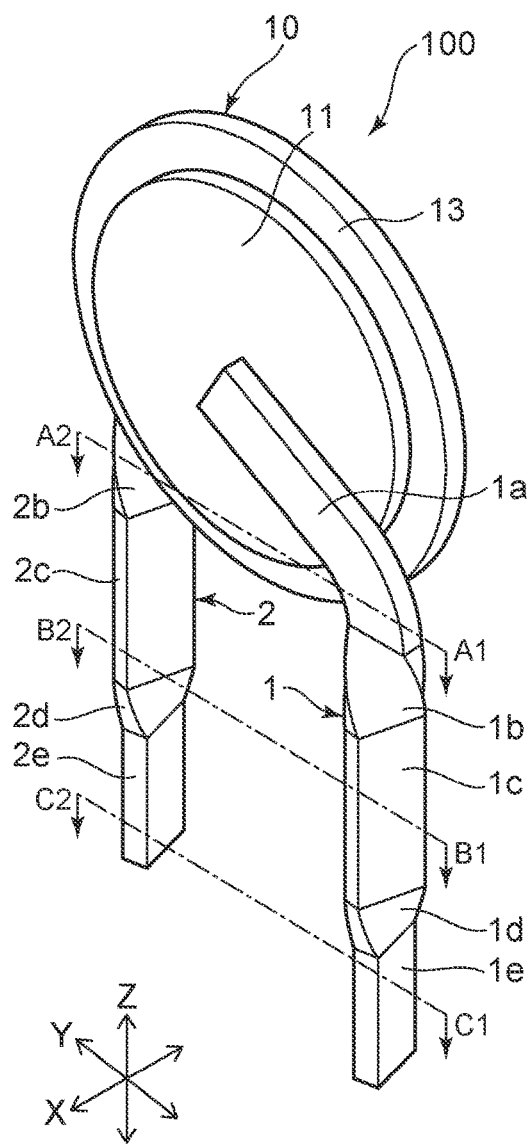
FIGS. 1A and 1B are perspective views showing an electronic component according to a first embodiment.

According to one embodiment, an electronic component includes an element, a first lead, and a second lead. The element includes a first electrode and a second electrode. The first lead is electrically connected with the first electrode, and has a flattened cross section. The second lead is electrically connected with the second electrode. The first lead includes a first connection portion, a first bonding portion, and a first extension portion. The first connection portion is connected with the first electrode. The first bonding portion is configured to be bonded with a substrate. The first bonding portion extends in an extension direction perpendicular to a first counter direction. The first counter direction connects the first electrode and the second electrode. The first extension portion is located between the first connection portion and the first bonding portion. The first extension portion extends in the extension direction. A longitudinal direction of the first bonding portion is different from a longitudinal direction of the first extension portion. The longitudinal direction of the first extension portion crosses a second counter direction. The second counter direction connects the first lead and the second lead.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
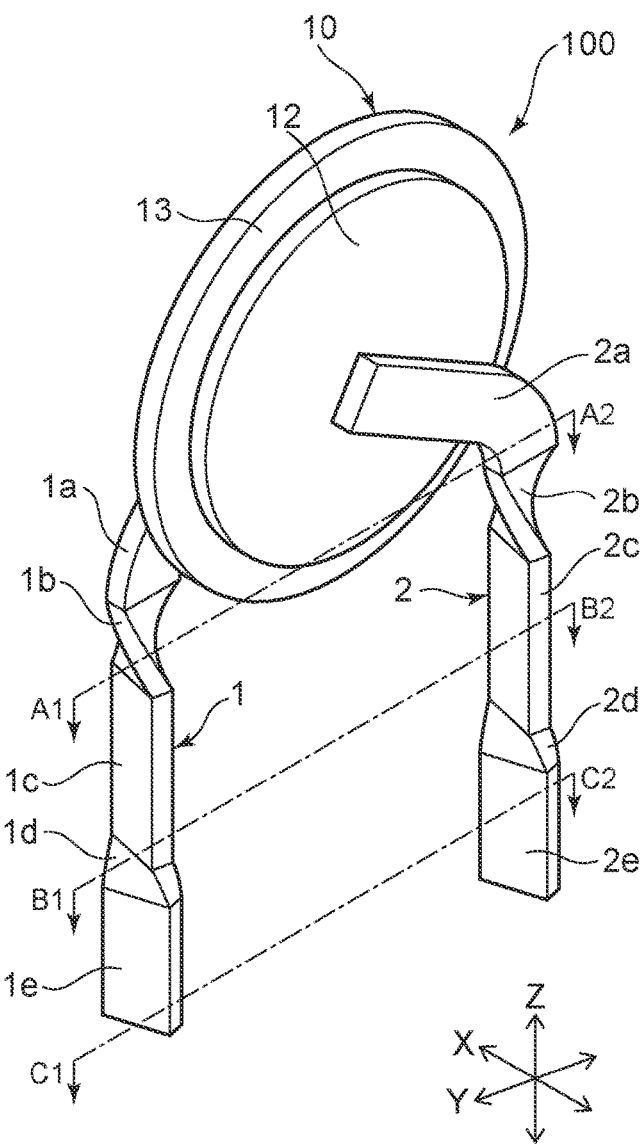

FIGS. 1A and 1B are perspective views showing an electronic component according to a first embodiment.

As shown in FIGS. 1A and 1B, the electronic component 100 according to the first embodiment includes a first lead 1, a second lead 2, and an element 10.

The element 10 includes a first electrode 11 and a second electrode 12. The first lead 1 and the second lead 2 are electrically connected respectively to the first and second electrodes 11 and 12. The first lead 1 and the second lead 2 are separated from each other.

In the description of embodiments hereinbelow, an XYZ coordinate system is used for the purpose of explanation. A direction that connects the first electrode 11 and the second electrode 12 is taken as an X-direction (a first counter direction). A direction that connects the first lead 1 and the second lead 2 is taken as a Y-direction (a second counter direction). A direction perpendicular to the X-direction and the Y-direction is taken as a Z-direction (an extension direction). The X-direction and the Y-direction are not always limited to being orthogonal.

The element 10 is, for example, a capacitor. A ceramic 13 is located between the first electrode 11 and the second electrode 12. The first electrode 11 and the second electrode 12 face each other in the X-direction via the ceramic 13. In the electronic component 100, the element 10 is a single-plate or stacked ceramic capacitor. The element 10 spreads along a plane crossing the X-direction. In other words, the length in the X-direction of the element 10 is less than the lengths of the element 10 in the Y-direction and the Z-direction. The first electrode 11, the second electrode 12, and the ceramic 13 may be covered with an insulating resin.

As shown in FIG. 1A, the first lead 1 includes a first connection portion 1a, a first extension portion 1c, and a first bonding portion 1e. The first connection portion 1a is electrically connected with the first electrode 11. At least a portion of the first connection portion 1a contacts the first electrode 11. For example, the first bonding portion 1e is configured to be bonded to an external substrate by solder. The first extension portion 1c is located between the first connection portion 1a and the first bonding portion 1e. The first extension portion 1c and the first bonding portion 1e extend in the Z-direction.

The first lead 1 has a flattened cross section. In other words, the length in one direction of the first lead 1 is different from the length in another direction of the first lead 1 at a cross section perpendicular to the direction in which the first lead 1 extends. The lengths will now be described more specifically with reference to FIGS. 2A to 2C.

FIGS. 2A to 2C are cross-sectional views of the first and second leads. More specifically, FIGS. 2A to 2C are cross-sectional views of the first and second leads 1 and 2 cut by the X-Y plane passing respectively through line A1-A2, line B1-B2, and line C1-C2 shown in FIGS. 1A and 1B. Line A1-A2, line B1-B2, and line C1-C2 are perpendicular to the X-direction.

In the electronic component 100, the cross section of the first lead 1 is rectangular. Therefore, as shown in FIGS. 2A to 2C, the first lead 1 includes first to fourth surfaces S1 to S4. The second surface S2 is located at the side opposite to the first surface S1. The fourth surface S4 is located at the side opposite to the third surface S3. A distance D1L between the first surface S1 and the second surface S2 is different from a distance D1S between the third surface S3 and the fourth surface S4. The distance D1L is greater than the distance D1S. The direction that connects the first surface S1 and the second surface S2 is a transverse direction SD1 of the first lead 1. The direction that connects the third surface S3 and the fourth surface S4 is a longitudinal direction LD1 of the first lead 1.

In the electronic component 100 as shown in FIG. 1A, the contact portion of the first connection portion 1a with the first electrode 11 is oblique to the Z-direction. Another portion of the first connection portion 1a is curved. Thereby, the longitudinal direction LD1 and the transverse direction SD1 at one end of the first connection portion 1a are perpendicular to the Z-direction. FIG. 2A shows the cross section of the first connection portion 1a at the one end. As shown in FIGS. 2B and 2C, the longitudinal directions LD1 and the transverse directions SD1 of the first extension portion 1c and the first bonding portion 1e also are perpendicular to the Z-direction.

As shown in FIGS. 2A and 2B, the longitudinal direction LD1 of the first extension portion 1c is different from the longitudinal direction LD1 of the first connection portion 1a. As shown in FIG. 1A, this is because a first intermediate portion 1b is located between the first connection portion 1a and the first extension portion 1c. The first intermediate portion 1b is twisted to cause a change of the longitudinal direction LD1 of the first lead 1.

As shown in FIG. 1A, a first interference portion 1d is located between the first extension portion 1c and the first bonding portion 1e. The first interference portion 1d is twisted so that the first interference portion 1d interferes with a substrate when the electronic component 100 is mounted to the substrate. In other words, when mounting, the first interference portion 1d catches on a hole provided in the substrate. Also, due to the twist of the first interference portion id as shown in FIGS. 2B and 2C, the longitudinal direction LD1 of the first bonding portion 1e is different from the longitudinal direction LD1 of the first extension portion 1c. The longitudinal direction LD1 of the first bonding portion 1e may be different from the longitudinal direction LD1 of the first connection portion 1a or may be parallel to the longitudinal direction LD1 of the first connection portion 1a.

The second lead 2 has a structure similar to the first lead 1. Specifically, as shown in FIG. 1B, the second lead 2 includes a second connection portion 2a, a second intermediate portion 2b, a second extension portion 2c, a second interference portion 2d, and a second bonding portion 2e.

The second connection portion 2a is electrically connected with the second electrode 12. At least a portion of the second connection portion 2a contacts the second electrode 12. Also, a portion of the second connection portion 2a is curved. The second bonding portion 2e is configured to be bonded to the substrate. The second extension portion 2c is located between the second connection portion 2a and the second bonding portion 2e. The second extension portion 2c and the second bonding portion 2e extend in the Z-direction. The second intermediate portion 2b is located between the second connection portion 2a and the second extension portion 2c. The second interference portion 2d is located between the second extension portion 2c and the second bonding portion 2e.

The second lead 2 has a flattened cross section. As shown in FIGS. 2A to 2C, the second lead 2 includes fifth to eighth surfaces S5 to S8. The sixth surface S6 is located at the side opposite to the fifth surface S5. The eighth surface S8 is located at the side opposite to the seventh surface S7. A distance D2L between the seventh surface S7 and the eighth surface S8 is greater than a distance D2S between the fifth surface S5 and the sixth surface S6. The direction that connects the fifth surface S5 and the sixth surface S6 is a transverse direction SD2 of the second lead 2. The direction that connects the seventh surface S7 and the eighth surface S8 is a longitudinal direction LD2 of the second lead 2.

The second intermediate portion 2b is twisted to cause a change of the longitudinal direction LD2 of the second lead 2. Therefore, the longitudinal direction LD2 of the second extension portion 2c is different from the longitudinal direction LD2 of the second connection portion 2a. The second interference portion 2d is twisted so that the second interference portion 2d interferes with the substrate when mounting. Therefore, the longitudinal direction LD2 of the second bonding portion 2e is different from the longitudinal direction LD2 of the second extension portion 2c. The longitudinal direction LD2 of the second bonding portion 2e may be different from the longitudinal direction LD2 of the second connection portion 2a and may be parallel to the longitudinal direction LD2 of the second connection portion 2a.

As shown in FIG. 2B, the first extension portion 1c and the second extension portion 2c face each other in the Y-direction. The longitudinal direction LD1 of the first extension portion 1c and the longitudinal direction LD2 of the second extension portion 2c cross the Y-direction. The longitudinal direction LD2 of the second extension portion 2c may be different from the longitudinal direction LD1 of the first extension portion 1c. Favorably, the longitudinal direction LD1 of the first extension portion 1c and the longitudinal direction LD2 of the second extension portion 2c are perpendicular to the Y-direction. In such a case, the second surface S2 of the first extension portion 1c and the fifth surface S5 of the second extension portion 2c squarely face each other.

Advantages of the first embodiment will now be described.

When the electronic component 100 is mounted, solder wets upward toward the element 10 from the first and second bonding portions 1e and 2e. The first lead 1 and the second lead 2 respectively include the first extension portion 1c and the second extension portion 2c to avoid shorts of the element 10. The first extension portion 1c and the second extension portion 2c extend in the Z-direction. By including the first and second extension portions 1c and 2c, the distance between the substrate and the element 10 can be increased, and shorts of the element 10 can be more reliably avoided.

There are cases where the electronic component 100 is used in environments in which vibrations occur. An inertial force is applied to the electronic component 100 when the electronic component 100 vibrates. In particular, compared to the first and second leads 1 and 2, a greater inertial force is applied to the element 10 that is larger and heavier. The inertial force that is applied to the element 10 is transmitted to the first and second leads 1 and 2 and disperses in the substrate. At this time, the load that is applied to the first and second leads 1 and 2 becomes large when the distance between the substrate and the element 10 is long. In particular, the load that is applied to the first and second leads 1 and 2 is even greater when the element 10 is large in size and weight. There is a possibility that the first lead 1 and the second lead 2 may be damaged when a large load is applied to the first and second leads 1 and 2.

For example, when the electronic component 100 vibrates in a direction (a cross direction) crossing the Y-direction, an inertial force is generated in the cross direction. Compared to an inertial force generated in the Y-direction, the load and the like on the first and second leads 1 and 2 are greater when the inertial force is generated in the cross direction. Therefore, there is a higher likelihood of damage of the first and second leads 1 and 2. For this problem, in the electronic component 100, the longitudinal direction LD1 of the first extension portion 1c is different from the longitudinal direction LD1 of the first connection portion 1a. The longitudinal direction LD1 of the first extension portion 1c crosses the Y-direction that connects the first lead 1 and the second lead 2. The rigidity of the first lead 1 in the cross direction can be increased by setting the longitudinal direction LD1 of the first extension portion 1c to cross the Y-direction. The damage of the first lead 1 when the inertial force is generated in the cross direction can be suppressed thereby. In other words, the likelihood of damage to the first lead 1 can be reduced. The reliability of the electronic component 100 can be increased thereby.

To further suppress damage of the first lead 1, it is also favorable for the distance between the substrate and the element 10 to be correctly set when mounting the electronic component 100. The distance between the substrate and the element 10 affects the load on the first lead 1. A larger load than expected is applied to the first lead 1 when the electronic component 100 is mounted if the distance between the substrate and the element 10 is greater than the design value. The likelihood of damage of the first lead 1 is increased thereby.

Figure 3A:
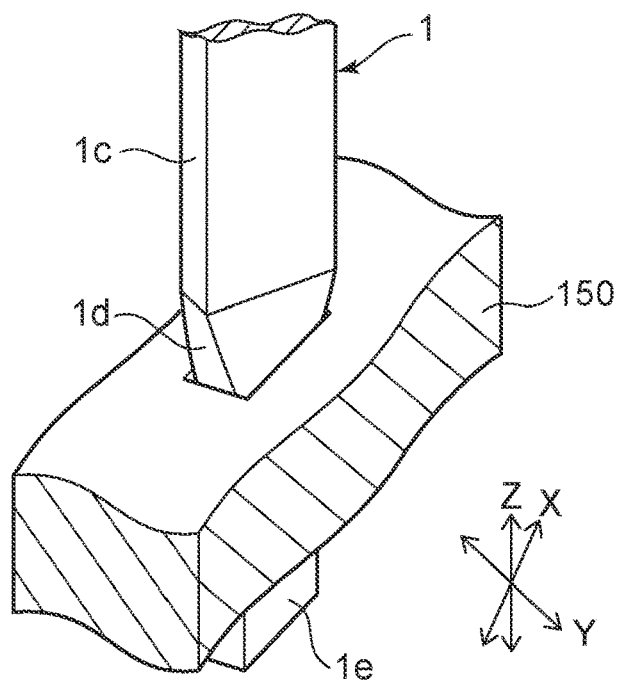
FIGS. 3A and 3B are perspective views showing the electronic component according to the first embodiment when mounting.
Figure 3B:
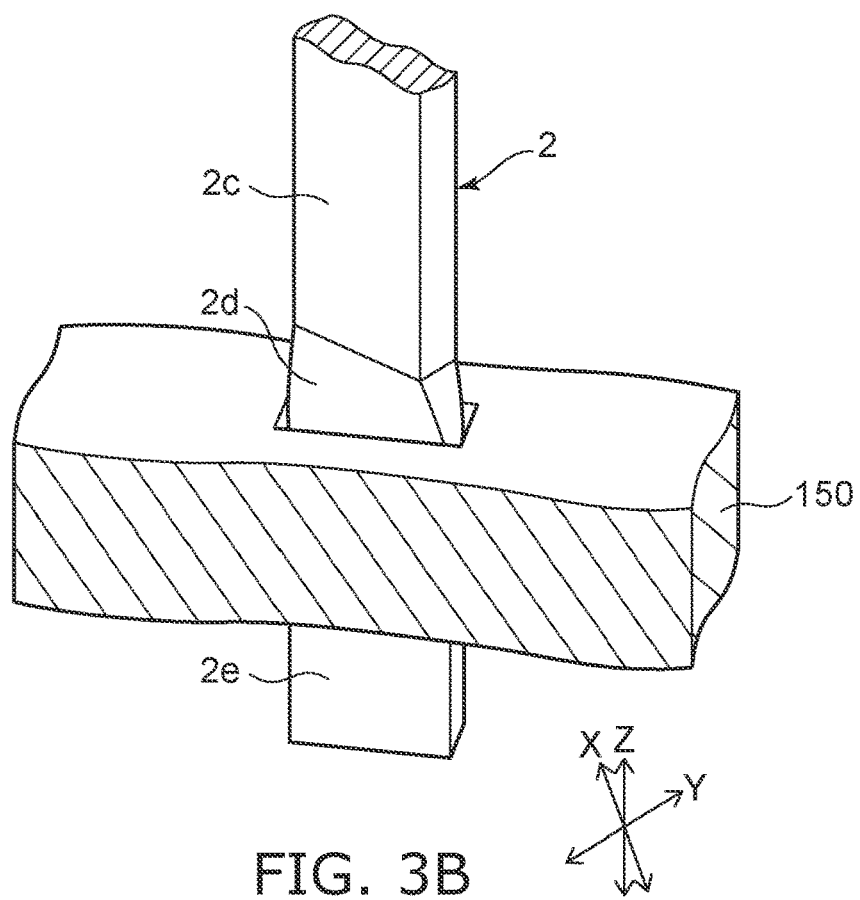

FIGS. 3A and 3B are perspective views showing the electronic component according to the first embodiment when mounting.

FIGS. 3A and 3B show portions of the electronic component 100 when viewed from mutually-different directions. In the electronic component 100 as shown in FIG. 3A, the longitudinal direction LD1 of the first bonding portion 1e is different from the longitudinal direction LD1 of the first extension portion 1c. Therefore, the first interference portion 1d between the first extension portion 1c and the first bonding portion 1e interferes with a substrate 150 when the first bonding portion 1e is mounted to the substrate 150. The Z-direction position of the first lead 1 with respect to the substrate 150 is determined thereby. As a result, the fluctuation of the distance between the substrate and the element 10 with respect to the design value can be suppressed.

Figure 4A:
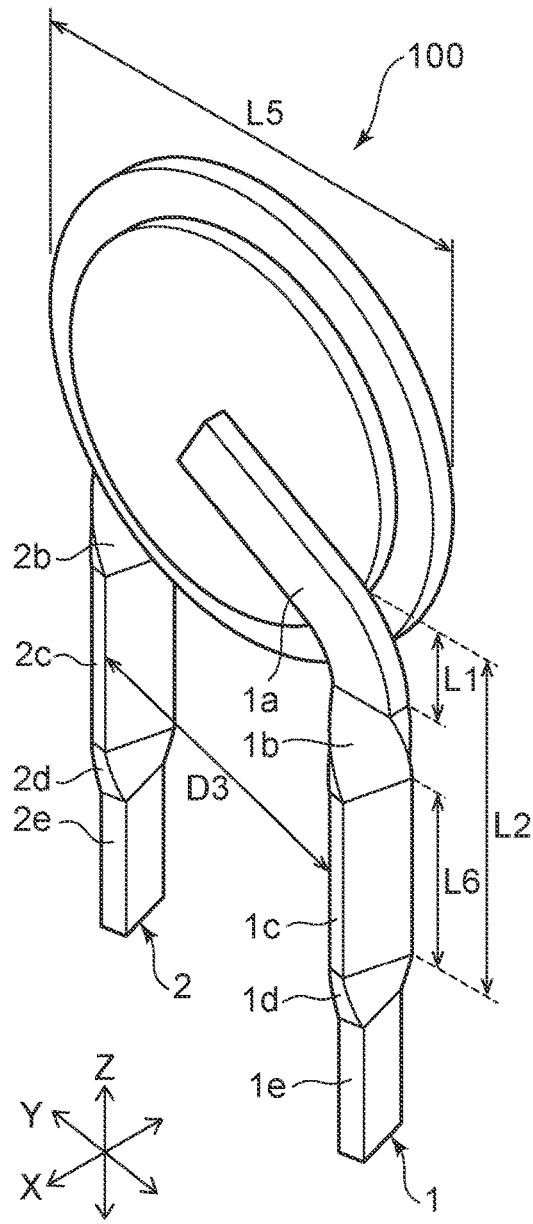
FIGS. 4A and 4B are perspective views showing the electronic component according to the first embodiment.
Figure 4B:
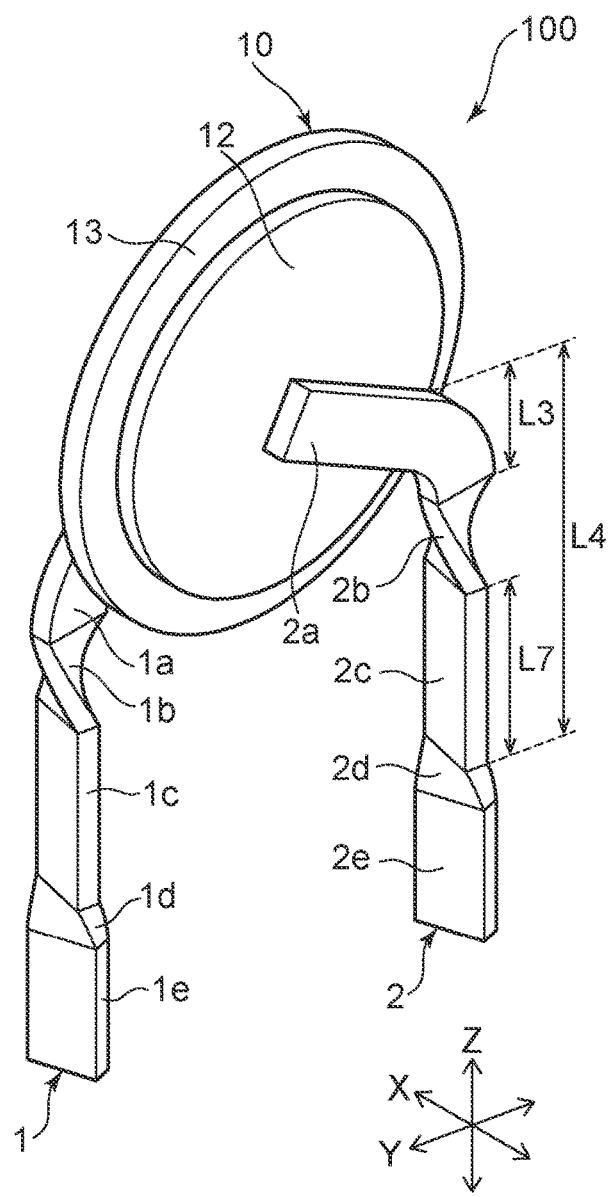

FIGS. 4A and 4B are perspective views showing the electronic component according to the first embodiment.

To further increase the rigidity of the first lead 1 in the cross direction, it is favorable for the first intermediate portion 1b to be more proximate to the element 10. For example, as shown in FIG. 4A, it is favorable for a length L1 in the Z-direction to the first intermediate portion 1b from the contact portion between the first connection portion 1a and the first electrode 11 to be less than ½ of a length L2 in the Z-direction from the contact portion to the first interference portion 1d. More favorably, the length L1 is less than ⅓ of the length L2.

To further increase the rigidity of the first lead 1 in the cross direction, it is favorable for the distance D1L to be greater than 2 times the distance D1S. On the other hand, it may be difficult to form or mount the first lead 1 if the distance D1L is too long compared to the distance D1S. It is therefore favorable for the distance D1L to be less than 10 times the distance D1S.

For the second lead 2 of the electronic component 100 according to the first embodiment as well, similarly to the first lead 1, the longitudinal direction LD2 of the second extension portion 2c is different from the longitudinal direction LD2 of the second connection portion 2a. The longitudinal direction LD2 of the second extension portion 2c crosses the Y-direction. The rigidity of the second lead 2 in the cross direction can be increased thereby, and damage of the second lead 2 can be suppressed.

As shown in FIG. 3B, the second interference portion 2d between the second extension portion 2c and the second bonding portion 2e is caused to interfere with the substrate 150 by setting the longitudinal direction LD2 of the second bonding portion 2e to be different from the longitudinal direction LD2 of the second extension portion 2c. The Z-direction position of the second lead 2 with respect to the substrate 150 is determined thereby. By determining the positions of both the first and second leads 1 and 2, the fluctuation of the distance between the substrate and the element 10 can be further suppressed.

To further increase the rigidity of the second lead 2 in the cross direction, it is favorable for the second intermediate portion 2b to be more proximate to the element 10. For example, as shown in FIG. 4B, it is favorable for a length L3 in the Z-direction to the second intermediate portion 2b from the contact portion between the second connection portion 2a and the second electrode 12 to be less than ½ of a length L4 in the Z-direction from the contact portion to the second interference portion 2d. More favorably, the length L3 is less than ⅓ of the length L4.

To further increase the rigidity of the second lead 2 in the cross direction, it is favorable for the distance D2L to be greater than 2 times the distance D2S. On the other hand, it may be difficult to form or mount the second lead 2 if the distance D2L is too long compared to the distance D2S. It is therefore favorable for the distance D2L to be less than 10 times the distance D2S.

The load on the first and second leads 1 and 2 is greatest when the inertial force is generated in a direction (an orthogonal direction) orthogonal to the Y-direction. It is therefore favorable for the rigidity of the first extension portion 1c and the rigidity of the second extension portion 2c to be large in the orthogonal direction.

Figure 5:
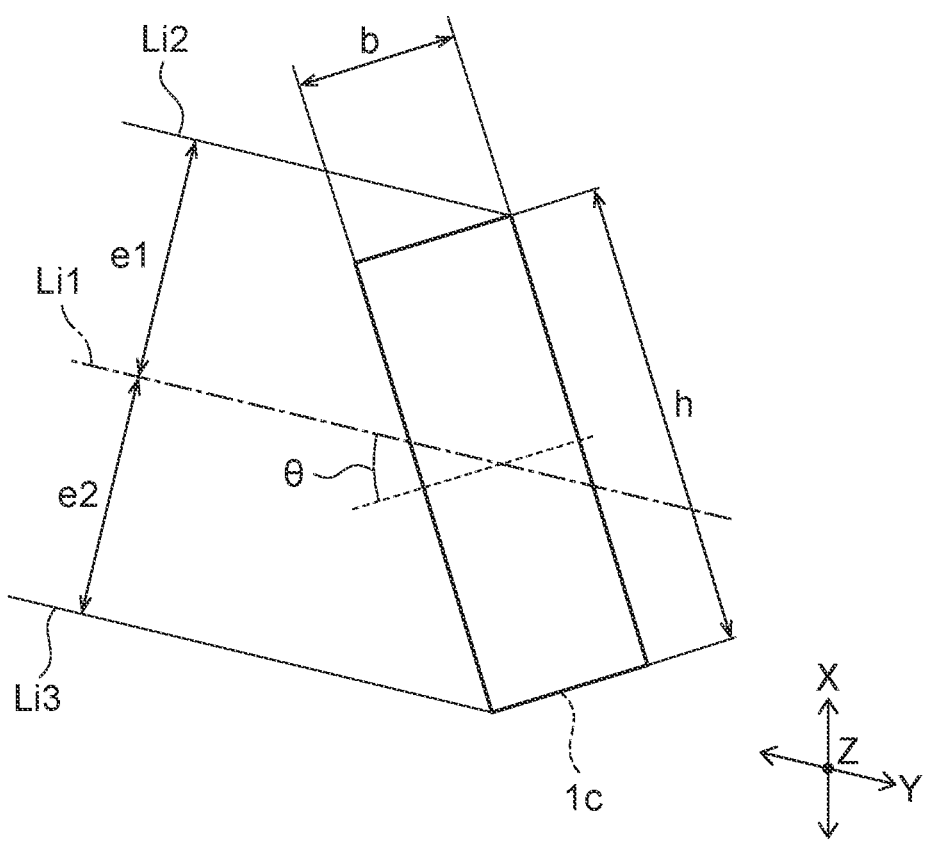
FIG. 5 is a cross-sectional view of the extension portion of the electronic component according to the first embodiment.
Figure 6:
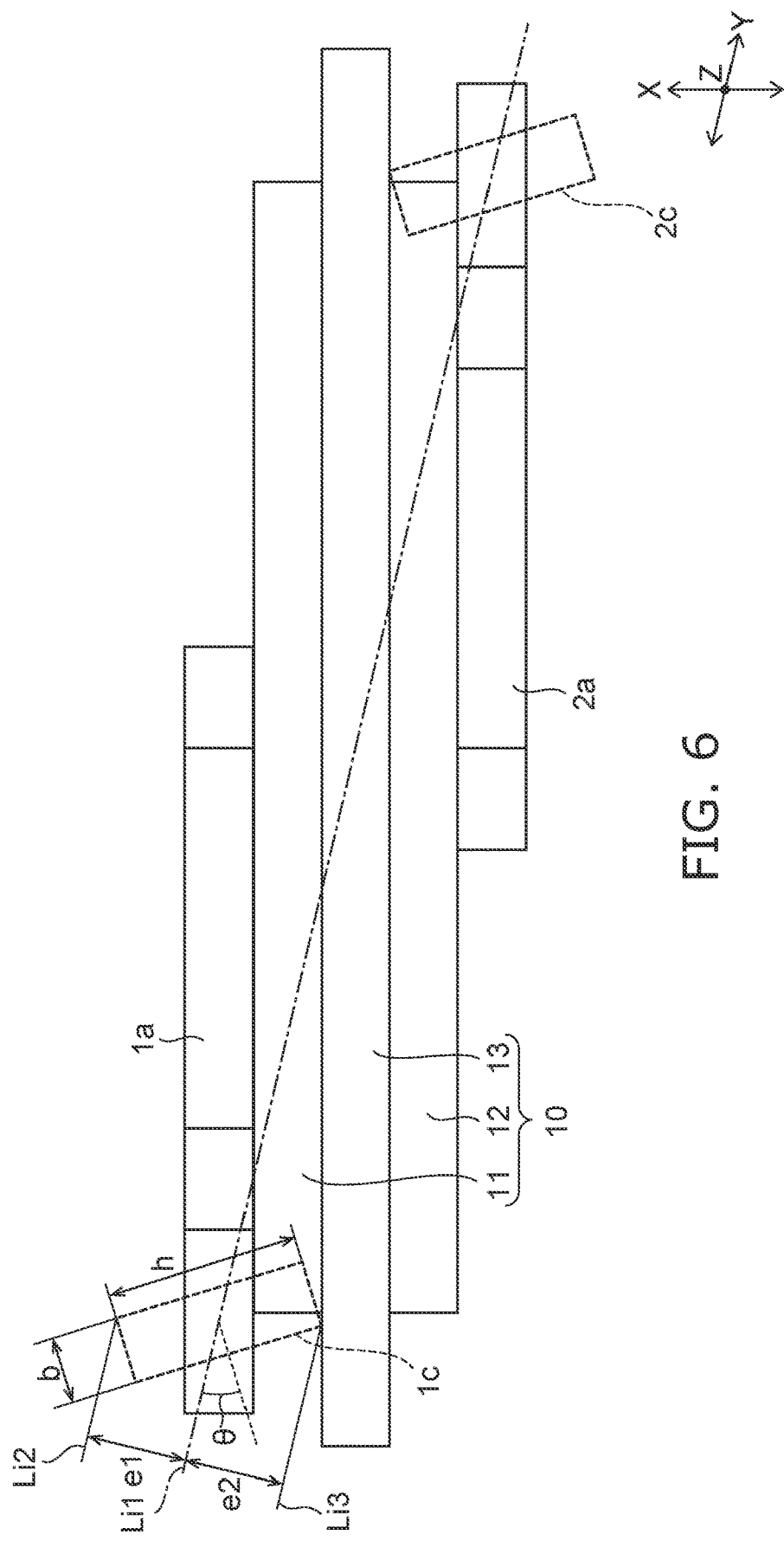
FIG. 6 is a schematic planar view showing the electronic component according to the first embodiment.

FIG. 5 is a cross-sectional view of the extension portion of the electronic component according to the first embodiment. FIG. 6 is a schematic planar view showing the electronic component according to the first embodiment.

For the first lead 1 in FIG. 6, the first extension portion 1c is shown by a broken line overlapping one end of the first connection portion 1a. For the second lead 2, the second extension portion 2c is shown by a broken line overlapping one end of the second connection portion 2a.

In FIGS. 5 and 6, a length h is the dimension in the longitudinal direction of the first extension portion 1c. A length b is the dimension in the transverse direction of the first extension portion 1c. Here, the length h is set to 3 times the length b. A length e1 is the distance between a straight line Li1 and a straight line Li2. A length e2 is the distance between the straight line Li1 and a straight line Li3. The straight line Li1 is parallel to the Y-direction that passes through the longitudinal-direction center and the transverse-direction center of the first extension portion 1c. The straight line Li2 is parallel to the Y-direction and passes through one orthogonal-direction end of the first extension portion 1c. The straight line Li3 is parallel to the Y-direction and passes through the other orthogonal-direction end of the first extension portion 1c. Here, the length e1 is equal to the length e2. An angle θ is the angle between the Y-direction and the bending axis. The angle θ corresponds to the angle between the longitudinal direction of the first extension portion 1c and the direction of the load applied to the first extension portion 1c.

A second area moment I of the first extension portion 1c when a load is applied to the first extension portion 1c is represented by the following formula 1.

$$I = \frac{bh(h^2\cos^2\theta + b^2\sin^2\theta)}{12} \qquad [\text{Formula 1}]$$

Figure 7:
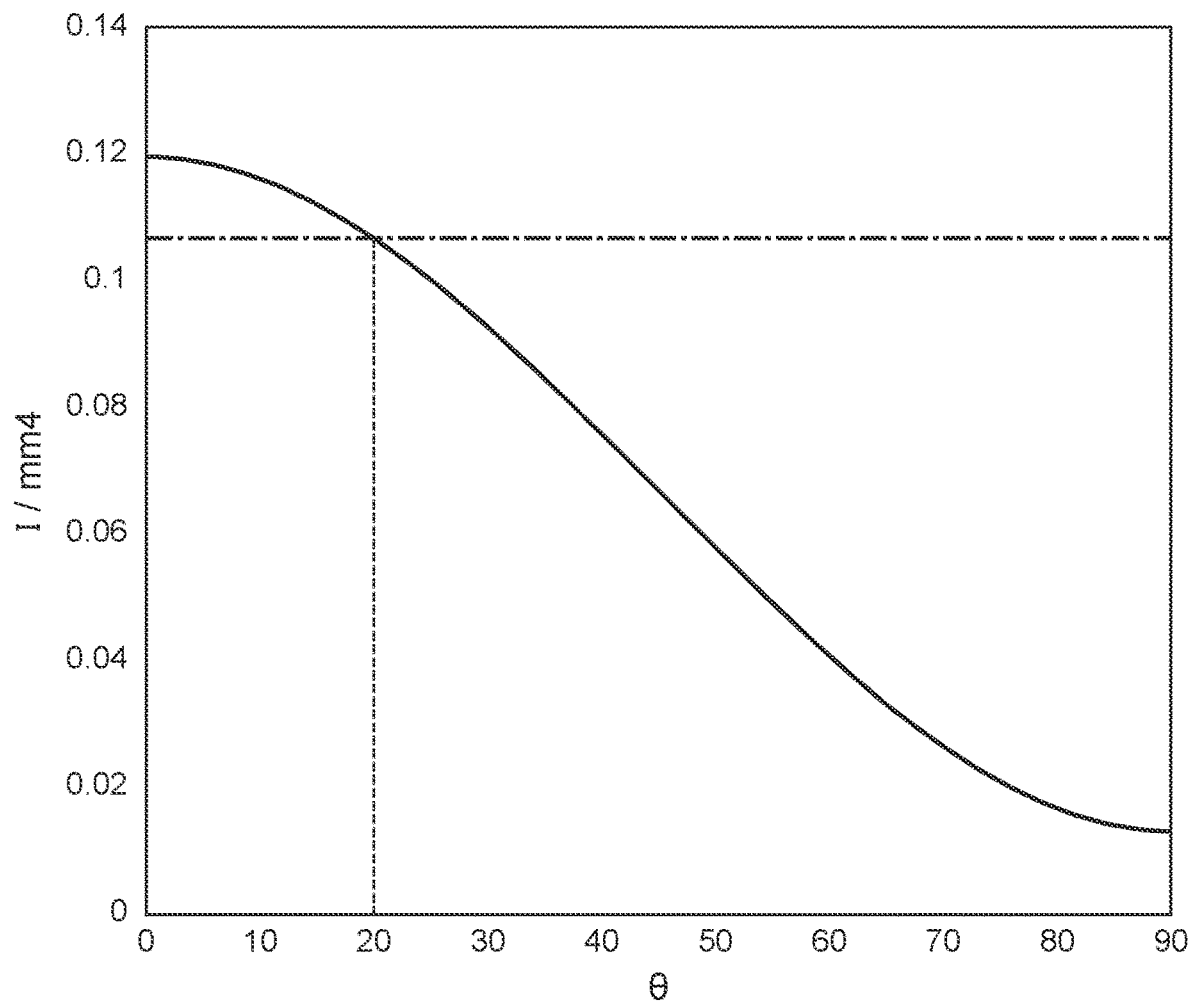
FIG. 7 shows calculation results of the change of the second area moment with respect to the angle θ.

FIG. 7 shows calculation results of the change of the second area moment with respect to the angle θ.

The relationship between the angle θ and the second area moment I according to the formula is illustrated in FIG. 7. As shown in FIG. 7, the second area moment I has a maximum when the angle θ is 0 degrees. The second area moment I decreases as the angle θ increases.

Generally, a safety margin is added to the required strength of a product by considering the manufacturing error, the degradation over time, etc. When the electronic component 100 is designed so that the angle θ is 0 degrees, by considering the design safety margin, a reduction of about 10% of the second area moment I is acceptable. In FIG. 7, the dot-dashed line indicates a value of 0.9 times the maximum second area moment I. As shown in FIG. 7, the second area moment I is 0.9 times the maximum second area moment I when the angle θ is about 20 degrees. It is therefore favorable for the angle between the longitudinal direction and the orthogonal direction of the first extension portion 1c to be less than 20 degrees. The calculation results described above are applicable to the second extension portion 2c as well. It is therefore favorable for the angle between the longitudinal direction and the orthogonal direction of the second extension portion 2c to be less than 20 degrees. More favorably, the angle between the longitudinal direction and the orthogonal direction of the first extension portion 1c is less than 10 degrees, and the angle between the longitudinal direction and the orthogonal direction of the second extension portion 2c is less than 10 degrees.

Most favorably, the longitudinal direction LD1 of the first extension portion 1c and the longitudinal direction LD2 of the second extension portion 2c are perpendicular to the Y-direction. In other words, it is most favorable for the angle θ to be 0 degrees. Damage of the first and second leads 1 and 2 can be further suppressed thereby.

In this specification, perpendicular (orthogonal) and parallel include not only exactly perpendicular and parallel but also, for example, the fluctuation of manufacturing processes, etc. It is sufficient for the longitudinal direction LD1 of the first extension portion 1c and the longitudinal direction LD2 of the second extension portion 2c to be substantially parallel to the orthogonal direction. For example, an error of less than 1 degree is acceptable as the manufacturing fluctuation.

FIGS. 8A to 8D are schematic views for describing a favorable structure.

Figure 8A:
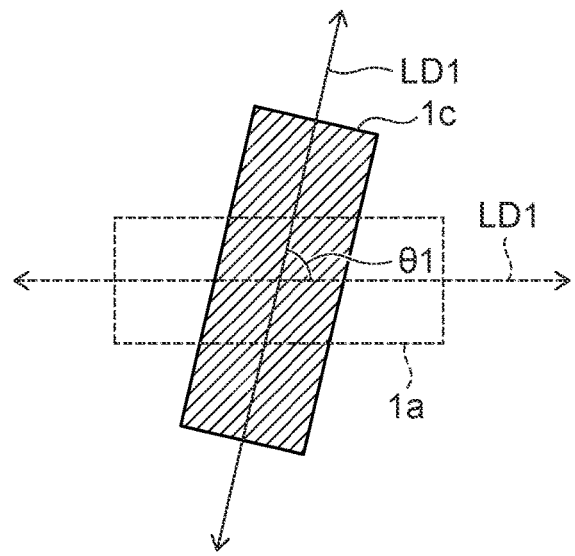
FIGS. 8A to 8D are schematic views for describing a favorable structure.

FIG. 8A shows cross-sectional shapes of the first connection portion 1a and the first extension portion 1c similar to FIGS. 2A and 2B. The first connection portion 1a is illustrated by a broken line. To reduce the load on the first intermediate portion 1b and to suppress damage of the first intermediate portion 1b, it is favorable for the angle of the change of the longitudinal direction at the first intermediate portion 1b to be less than 90 degrees. In other words, it is favorable for an angle θ1 between the longitudinal direction LD1 (the broken line) of the first connection portion 1a and the longitudinal direction LD1 (the solid line) of the first extension portion 1c to be less than 90 degrees. Also, it is favorable for a portion of the first connection portion 1a and a portion of the first extension portion 1c to overlap when viewed along the Z-direction.

Figure 8B:
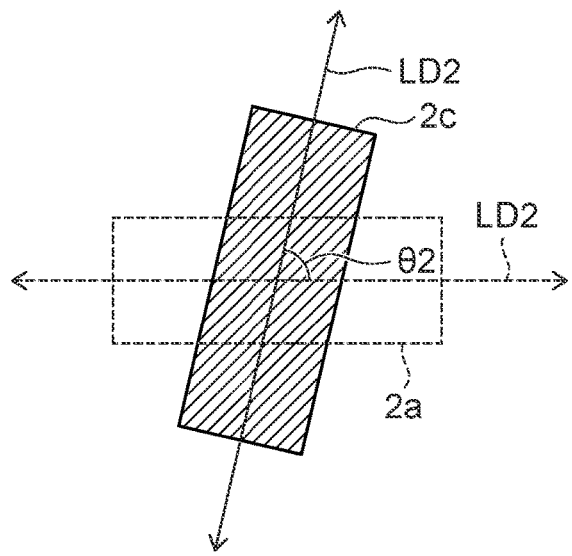

FIG. 8B shows cross-sectional shapes of the second connection portion 2a and the second extension portion 2c similar to FIGS. 2A and 2B. The second connection portion 2a is illustrated by a broken line. To reduce the load on the second intermediate portion 2b and to suppress damage of the second intermediate portion 2b, it is favorable for the angle of the change of the longitudinal direction at the second intermediate portion 2b to be less than 90 degrees. In other words, it is favorable for an angle θ2 between the longitudinal direction LD2 (the broken line) of the second connection portion 2a and the longitudinal direction LD2 (the solid line) of the second extension portion 2c to be less than 90 degrees. Also, it is favorable for a portion of the second connection portion 2a and a portion of the second extension portion 2c to overlap when viewed along the Z-direction.

Figure 8C:
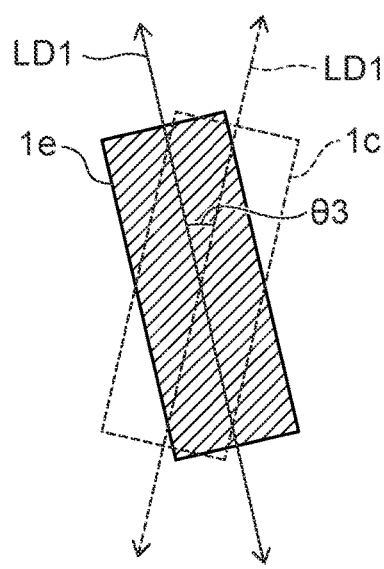

FIG. 8C shows cross-sectional shapes of the first extension portion 1c and the first bonding portion 1e similar to FIGS. 2B and 2C. The first extension portion 1c is illustrated by a broken line. To reduce the load on the first interference portion 1d and suppress damage of the first interference portion 1d, it is favorable for the angle of the change of the longitudinal direction at the first interference portion 1d to be less than 90 degrees. In other words, it is favorable for an angle θ3 between the longitudinal direction LD1 (the broken line) of the first extension portion 1c and the longitudinal direction LD1 (the solid line) of the first bonding portion 1e to be less than 90 degrees. Also, it is favorable for a portion of the first extension portion 1c and a portion of the first bonding portion 1e to overlap when viewed along the Z-direction.

Figure 8D:
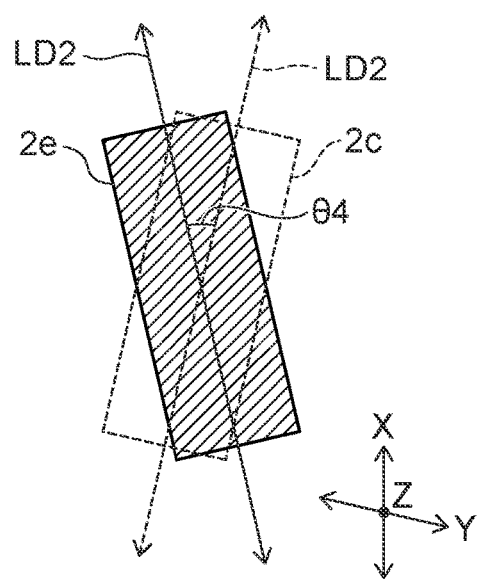

FIG. 8D shows cross-sectional shapes of the second extension portion 2c and the second bonding portion 2e similar to FIGS. 2B and 2C. The second extension portion 2c is illustrated by a broken line. To reduce the load on the second interference portion 2d and suppress damage of the second interference portion 2d, it is favorable for the angle of the change of the longitudinal direction at the second interference portion 2d to be less than 90 degrees. In other words, it is favorable for an angle θ4 between the longitudinal direction LD2 (the broken line) of the second extension portion 2c and the longitudinal direction LD2 (the solid line) of the second bonding portion 2e to be less than 90 degrees. Also, it is favorable for a portion of the second extension portion 2c and a portion of the second bonding portion 2e to overlap when viewed along the Z-direction.

To suppress damage of the first interference portion 1d, it is favorable for the angle of the twist of the first interference portion 1d to be small enough that the first interference portion 1d interferes with the substrate. For example, the angle θ3 is less than the angle θ1. Similarly, to suppress damage of the second interference portion 2d, it is favorable for the angle of the twist of the second interference portion 2d to be small enough that the second interference portion 2d interferes with the substrate. For example, the angle θ4 is less than the angle θ2.

It is favorable for the orientation of the twist of the first interference portion 1d to be the same as the orientation of the twist of the first intermediate portion 1b. By having the same twist orientation, the first bonding portion 1e is positioned further outward from the electronic component 100. Similarly, it is favorable for the orientation of the twist of the second interference portion 2d to be the same as the orientation of the twist of the second intermediate portion 2b. Thereby, the second bonding portion 2e is positioned further outward from the electronic component 100. The distance in the Y-direction between the first bonding portion 1e and the second bonding portion 2e is increased, and the stability of the mounted electronic component 100 is increased.

Compared to when a portion of each lead is bent to make a portion that interferes with the substrate, the length of each lead can be reduced by twisting to make the interfering portion. By reducing the length of each lead, the load that is applied to each lead when the electronic component 100 vibrates can be reduced.

FIGS. 9A to 9D are schematic views for describing a favorable structure.

Figure 9A:
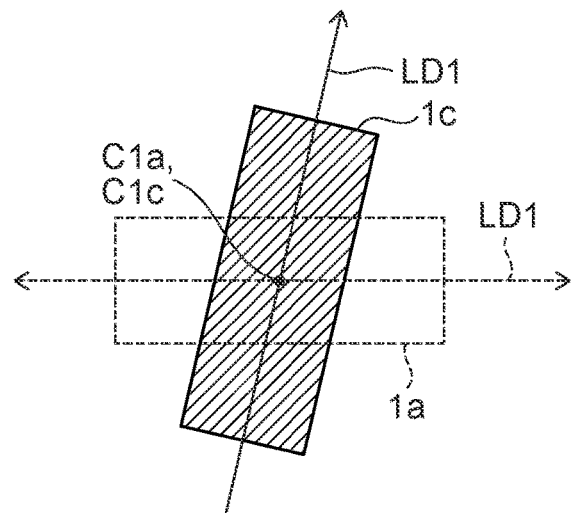
FIGS. 9A to 9D are schematic views for describing a favorable structure.

As shown in FIG. 9A, in the Z-direction, a center C1a in the longitudinal direction LD1 of the first connection portion 1a overlaps a center C1c in the longitudinal direction LD1 of the first extension portion 1c. Favorably, the center position in the X-Y plane of the first connection portion 1a matches the center position in the X-Y plane of the first extension portion 1c. The rotation center of the twist of the first intermediate portion 1b matches the center in the X-Y plane of the first connection portion 1a or the first extension portion 1c.

Figure 9B:
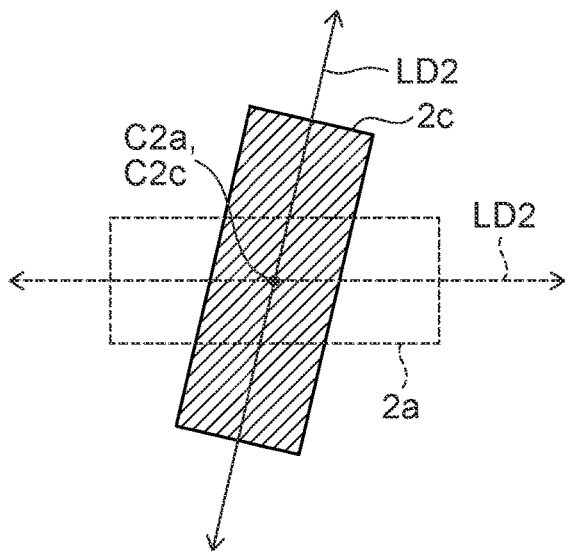
Figure 9C:
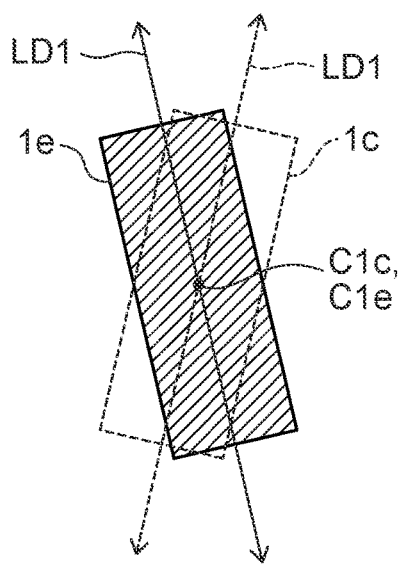

As shown in FIG. 9C, in the Z-direction, the center C1c in the longitudinal direction LD1 of the first extension portion 1c overlaps a center C1e in the longitudinal direction LD1 of the first bonding portion 1e. Favorably, the center position in the X-Y plane of the first extension portion 1c matches the center position in the X-Y plane of the first bonding portion 1e. The rotation center of the twist of the first interference portion 1d matches the center in the X-Y plane of the first extension portion 1c or the first bonding portion 1e.

For the second lead 2 as well, similarly to the first lead 1, in the Z-direction, a center C2a in the longitudinal direction LD2 of the second connection portion 2a overlaps a center C2c in the longitudinal direction LD2 of the second extension portion 2c as shown in FIG. 9B. Favorably, the center position in the X-Y plane of the second connection portion 2a matches the center position in the X-Y plane of the second extension portion 2c. The rotation center of the twist of the second intermediate portion 2b matches the center in the X-Y plane of the second connection portion 2a or the second extension portion 2c.

Figure 9D:
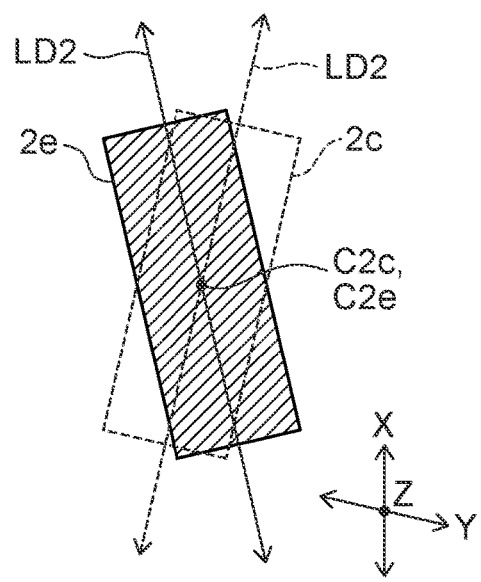

As shown in FIG. 9D, in the Z-direction, the center C2c in the longitudinal direction LD2 of the second extension portion 2c overlaps a center C2e in the longitudinal direction LD2 of the second bonding portion 2e. Favorably, the center position in the X-Y plane of the second extension portion 2c matches the center position in the X-Y plane of the second bonding portion 2e. The rotation center of the twist of the second interference portion 2d matches the center in the X-Y plane of the second extension portion 2c or the second bonding portion 2e.

By twisting the first intermediate portion 1b so that the center C1a overlaps the center C1c in the Z-direction, the dimension in the X-direction and the dimension in the Y-direction of the first intermediate portion 1b can be reduced. In other words, the length of the first lead 1 can be reduced. By reducing the length of the first lead 1, the load applied to the first lead 1 when the electronic component 100 vibrates can be reduced.

Similarly, by twisting the first interference portion 1d so that the center C1c overlaps the center C1e in the Z-direction, the length of the first lead 1 can be reduced. By twisting the second intermediate portion 2b so that the center C2a overlaps the center C2c in the Z-direction, the length of the second lead 2 can be reduced. By twisting the second interference portion 2d so that the center C2c overlaps the center C2e in the Z-direction, the length of the second lead 2 can be reduced.

In the electronic component 100 as shown in FIG. 2A, the longitudinal direction LD1 of the first connection portion 1a and the longitudinal direction LD2 of the second connection portion 2a are parallel to each other. The longitudinal direction LD1 of the first bonding portion 1e and the longitudinal direction LD2 of the second bonding portion 2e are parallel to each other. However, the relationship between the longitudinal direction LD1 of the first connection portion 1a and the longitudinal direction LD2 of the second connection portion 2a is arbitrary as long as the first connection portion 1a and the second connection portion 2a can be connected respectively to the first and second electrodes 11 and 12. The relationship between the longitudinal direction LD1 of the first bonding portion 1e and the longitudinal direction LD2 of the second bonding portion 2e is arbitrary as long as the first bonding portion 1e and the second bonding portion 2e can be bonded to the substrate. The angle of the twist of the first intermediate portion 1b may be the same as the angle of the twist of the second intermediate portion 2b or may be different from the angle of the twist of the second intermediate portion 2b. The angle of the twist of the first interference portion 1d may be the same as the angle of the twist of the second interference portion 2d or may be different from the angle of the twist of the second interference portion 2d.

Dimension Examples

Dimension examples of the electronic component 100 will now be described. The first embodiment is especially favorable when a large element 10 is used. For example, a length L5 of the element 10 in a direction perpendicular to the X-direction and the Z-direction shown in FIG. 4A is greater than 3 mm and less than 30 mm. A distance D3 between the first lead 1 (the first extension portion 1c) and the second lead 2 (the second extension portion 2c) is greater than 3 mm and less than 40 mm. The lengths L2 and L4 each are greater than 1 mm and less than 15 mm. Lengths L6 and L7 in the Z-direction of the first and second extension portions 1c and 2c each are greater than 0.5 mm and less than 10 mm.

Figure 10A:
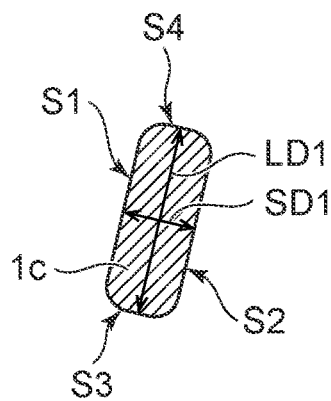
FIGS. 10A to 10C are cross-sectional views showing cross-sectional shapes of the first and second leads.
Figure 10A:
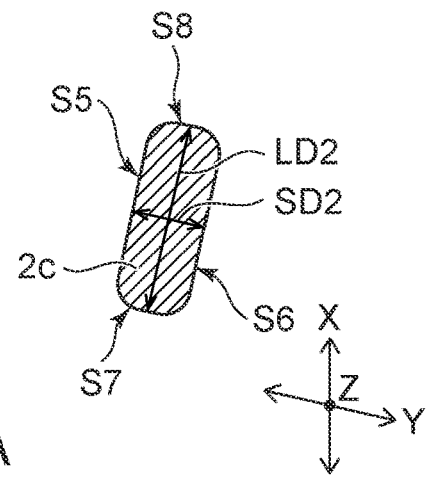
Figure 10B:
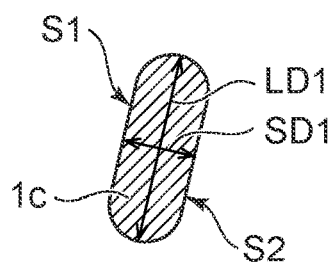
Figure 10B:
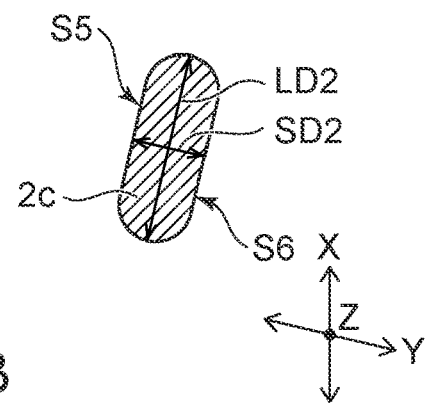
Figure 10C:
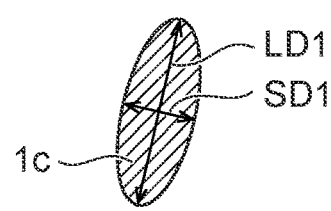
Figure 10C:
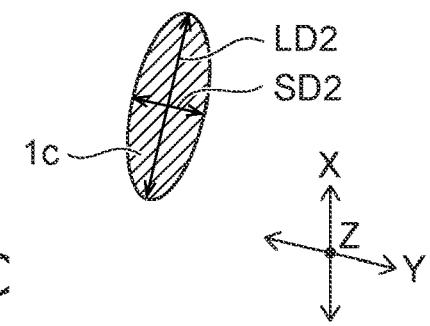

FIGS. 10A to 10C are cross-sectional views showing cross-sectional shapes of the first and second leads.

The cross-sectional shapes in the X-Y plane of the first and second leads 1 and 2 may be rounded rectangles as shown in FIG. 10A. By having rounded corners, damage of the first lead 1, the second lead 2, or the substrate when bonding can be suppressed. Here, the rounded rectangle shown in FIG. 10A also is treated as substantially a rectangle.

The cross-sectional shapes in the X-Y plane of the first and second leads 1 and 2 may be ovals as shown in FIG. 10B. In the cross-sectional shapes shown in FIG. 10B, the length of the first extension portion 1c in the direction perpendicular to the direction connecting the first surface S1 and the second surface S2 is greater than the distance between the first surface S1 and the second surface S2. The perpendicular direction corresponds to the longitudinal direction LD1 of the first extension portion 1c. The direction that connects the first surface S1 and the second surface S2 corresponds to the transverse direction SD1 of the first extension portion 1c. The length of the second extension portion 2c in the direction perpendicular to the direction connecting the fifth surface S5 and the sixth surface S6 is greater than the distance between the fifth surface S5 and the sixth surface S6. The perpendicular direction corresponds to the longitudinal direction LD2 of the second extension portion 2c. The direction that connects the fifth surface S5 and the sixth surface S6 corresponds to the transverse direction SD2 of the second extension portion 2c.

The cross-sectional shapes in the X-Y plane of the first and second leads 1 and 2 may be ellipses as shown in FIG. 10C. In such a case, the major-axis direction of the ellipse corresponds to the longitudinal direction. The minor-axis direction of the ellipse corresponds to the transverse direction. The specific cross-sectional shapes of the first and second leads 1 and 2 are arbitrary as long as the first lead 1 and the second lead 2 have some flattened cross section.

Favorably, the cross-sectional shapes in the X-Y plane of the first and second leads 1 and 2 are rectangles as shown in FIGS. 2A to 2C or FIG. 10A. This is because leads that have rectangular cross-sectional shapes are easy to manufacture and form, and the rigidity in the cross direction can be most improved.

Modifications

Figure 11:
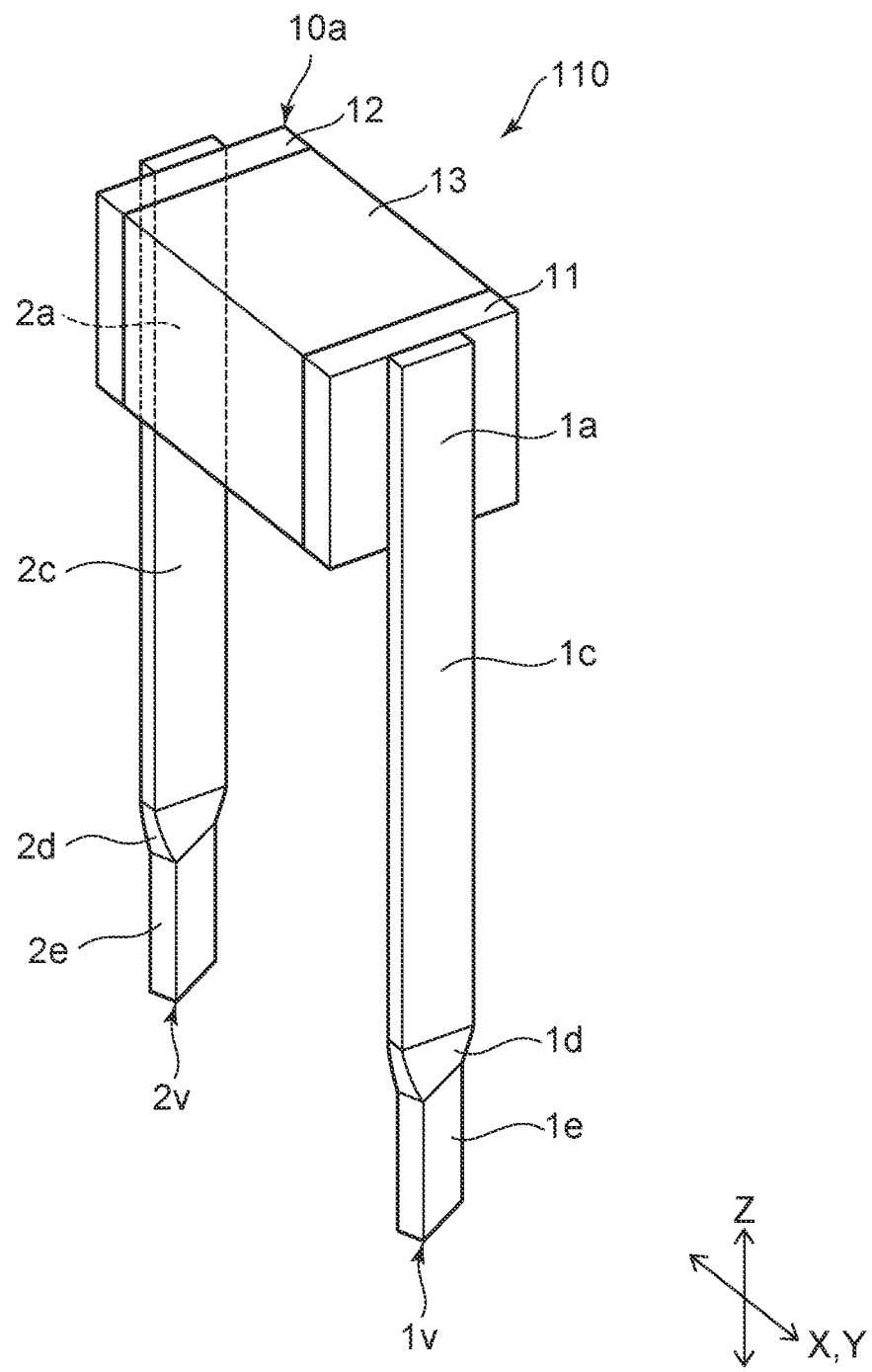
FIG. 11 is a perspective view showing an electronic component according to a modification of the first embodiment.

FIG. 11 is a perspective view showing an electronic component according to a modification of the first embodiment.

The electronic component 110 according to the modification includes an element 10a. The shape of the element 10a is different from the shape of the element 10. The element 10a is a stacked ceramic capacitor. Similarly to the element 10, the element 10a includes the first electrode 11, the second electrode 12, and the ceramic 13. The first electrode 11, the second electrode 12, and the ceramic 13 may be covered with an insulating resin. In the electronic component 110, the X-direction that connects the first electrode 11 and the second electrode 12 is parallel to the Y-direction connecting a first lead 1v and a second lead 2v.

The first lead 1v has a flattened cross section and includes the first connection portion 1a, the first extension portion 1c, the first interference portion 1d, and the first bonding portion 1e. The first lead 1v is different from the first lead 1, and does not include the first intermediate portion 1b. Therefore, the longitudinal direction of the first connection portion 1a is, for example, parallel to the longitudinal direction of the first extension portion 1c.

Similarly, the second lead 2v has a flattened cross section and includes the second connection portion 2a, the second extension portion 2c, the second interference portion 2d, and the second bonding portion 2e. In FIG. 11, the second connection portion 2a is shown by a broken line. The second lead 2v is different from the second lead 2 and does not include the second intermediate portion 2b. Therefore, the longitudinal direction of the second connection portion 2a is, for example, parallel to the longitudinal direction of the second extension portion 2c.

The portion of the first lead 1v between the first connection portion 1a and the first extension portion 1c and the portion of the second lead 2v between the second connection portion 2a and the second extension portion 2c may be curved to adjust the distance between the first bonding portion 1e and the second bonding portion 2e.

The longitudinal direction of the first extension portion 1c of the first lead 1v and the longitudinal direction of the second extension portion 2c of the second lead 2v cross the Y-direction. The rigidity of the first and second leads 1v and 2v in the cross direction crossing the Y-direction can be increased thereby.

The longitudinal direction of the first bonding portion 1e is different from the longitudinal direction of the first extension portion 1c. The first lead 1v interferes with an external substrate at the first interference portion 1d. The longitudinal direction of the second bonding portion 2e is different from the longitudinal direction of the second extension portion 2c. The second lead 2v interferes with the external substrate at the second interference portion 2d. The Z-direction positions of the first and second leads 1v and 2v with respect to the substrate are determined thereby.

According to the modification, similarly to the first embodiment described above, damage of the electronic component 110 can be suppressed, and the reliability of the electronic component 110 can be increased.

Figure 12:
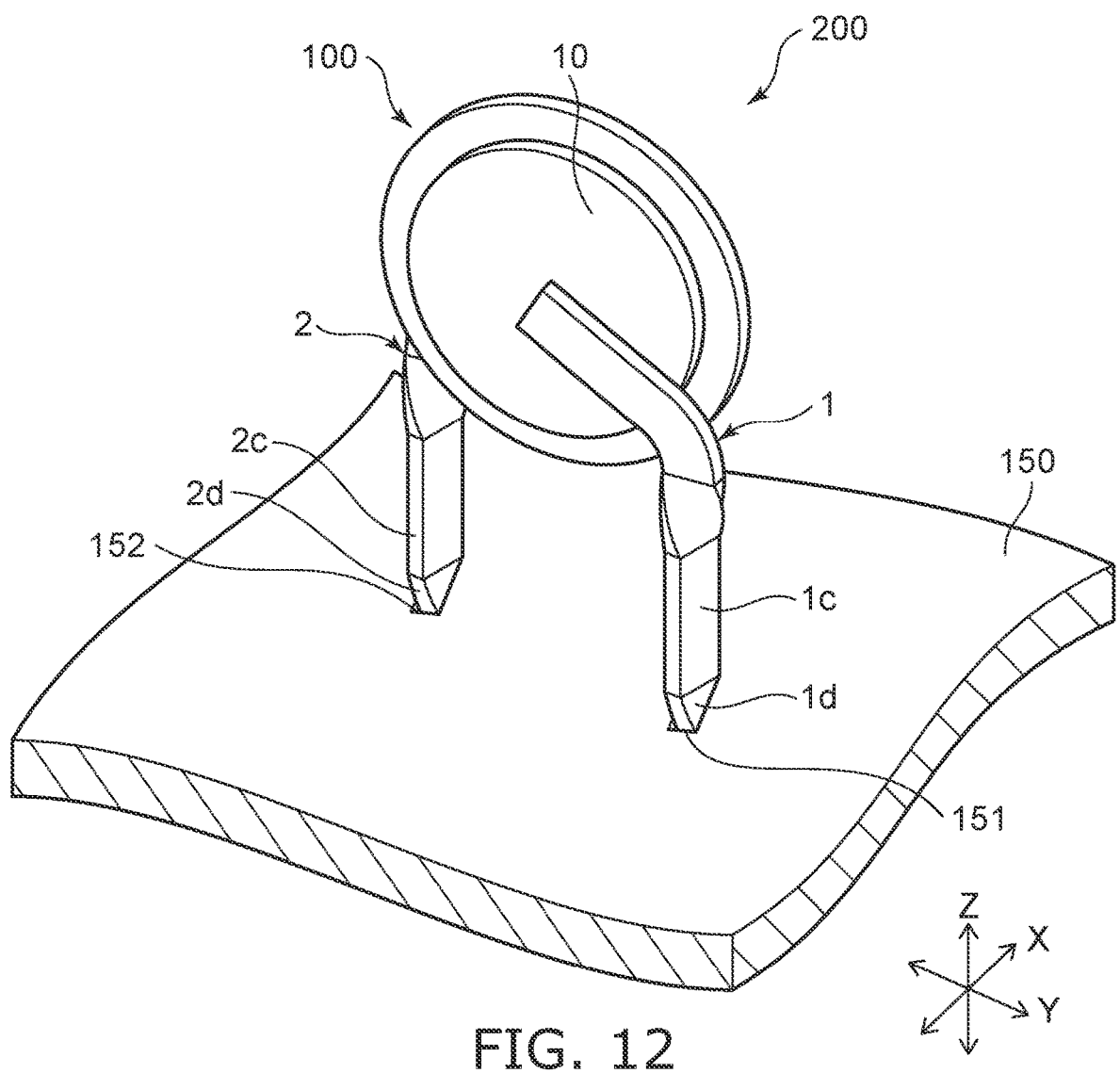
FIG. 12 is a perspective view showing an electronic device according to the first embodiment.

FIG. 12 is a perspective view showing an electronic device according to the first embodiment.

As shown in FIG. 12, the electronic device 200 according to the first embodiment includes the electronic component 100 and the substrate 150. The substrate 150 includes holes 151 and 152. The first and second bonding portions 1e and 2e of the electronic component 100 are inserted respectively into the holes 151 and 152 and are bonded with wiring on the substrate by solder. The solder and the wiring are not illustrated in FIG. 12. When mounting the electronic component 100, the position of the electronic component 100 with respect to the substrate 150 is determined by the first interference portion 1d and the second interference portion 2d interfering with the substrate 150.

In the electronic device 200 according to the first embodiment, damage of the first and second leads 1 and 2 of the electronic component 100 can be suppressed. The reliability of the electronic device 200 can be increased.

Figure 13A:
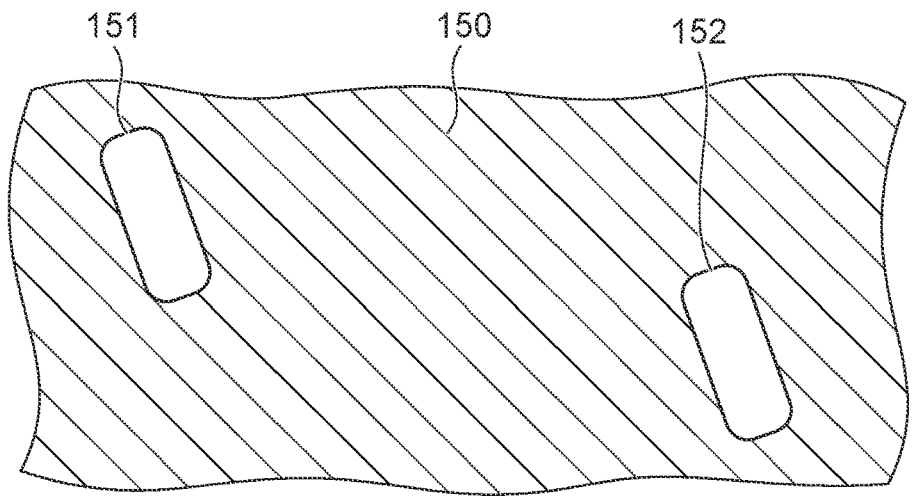
FIGS. 13A to 13C are plan views showing substrates of the electronic device according to the first embodiment.
Figure 13B:
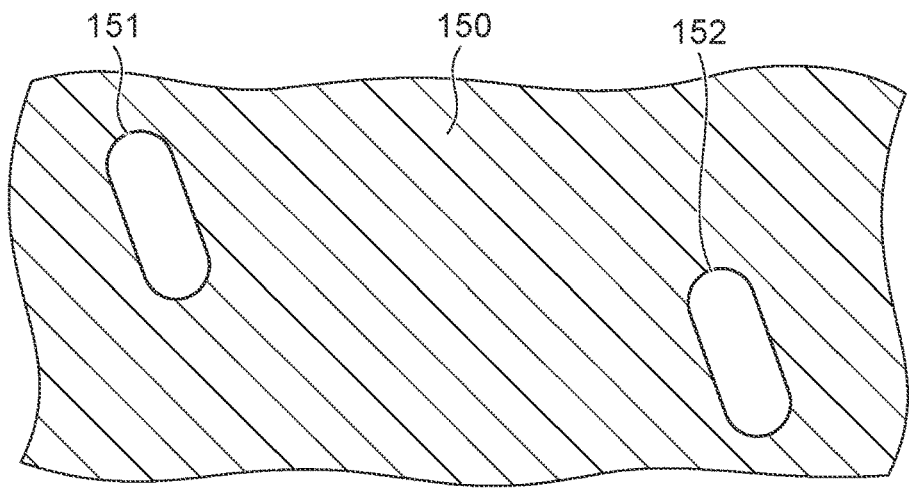
Figure 13C:
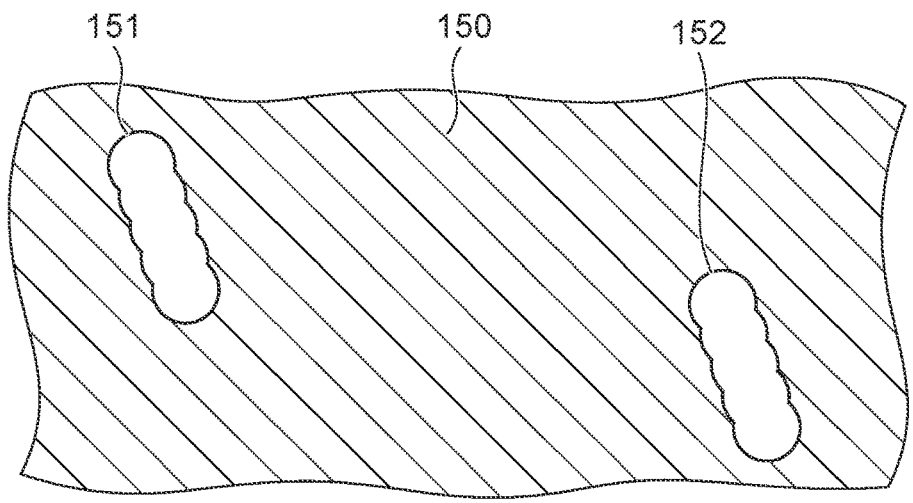

FIGS. 13A to 13C are plan views showing substrates of the electronic device according to the first embodiment.

The shapes of the holes 151 and 152 of the substrate 150 are arbitrary as long as the first bonding portion 1e and the second bonding portion 2e can be inserted and interference with the first interference portion 1d and the second interference portion 2d is possible. For example, the shapes of the holes 151 and 152 may be the rounded rectangles shown in FIG. 13A or the ovals shown in FIG. 13B. The shapes of the holes 151 and 152 may be shapes made of multiple overlapping circles as shown in FIG. 13C.

Second Embodiment

Figure 14A:
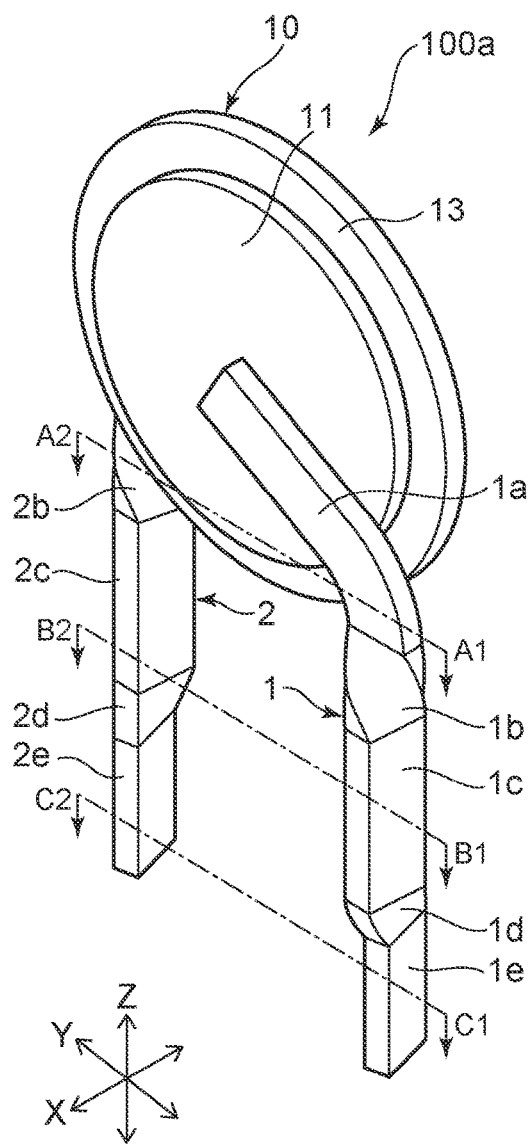
FIGS. 14A and 14B are perspective views showing an electronic component according to a second embodiment.
Figure 14B:
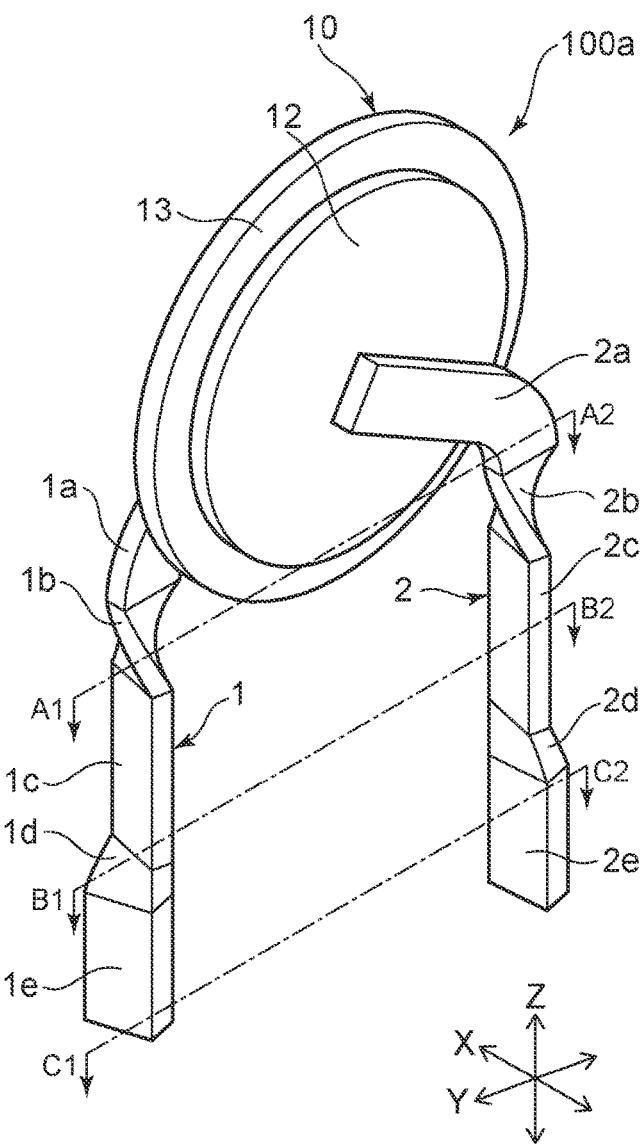

FIGS. 14A and 14B are perspective views showing an electronic component according to a second embodiment.

The structures of the first interference portion 1d of the first lead 1 and the second interference portion 2d of the second lead 2 of the electronic component 100a according to the second embodiment are different from those of the electronic component 100 according to the first embodiment.

Figures 15A, 15B:
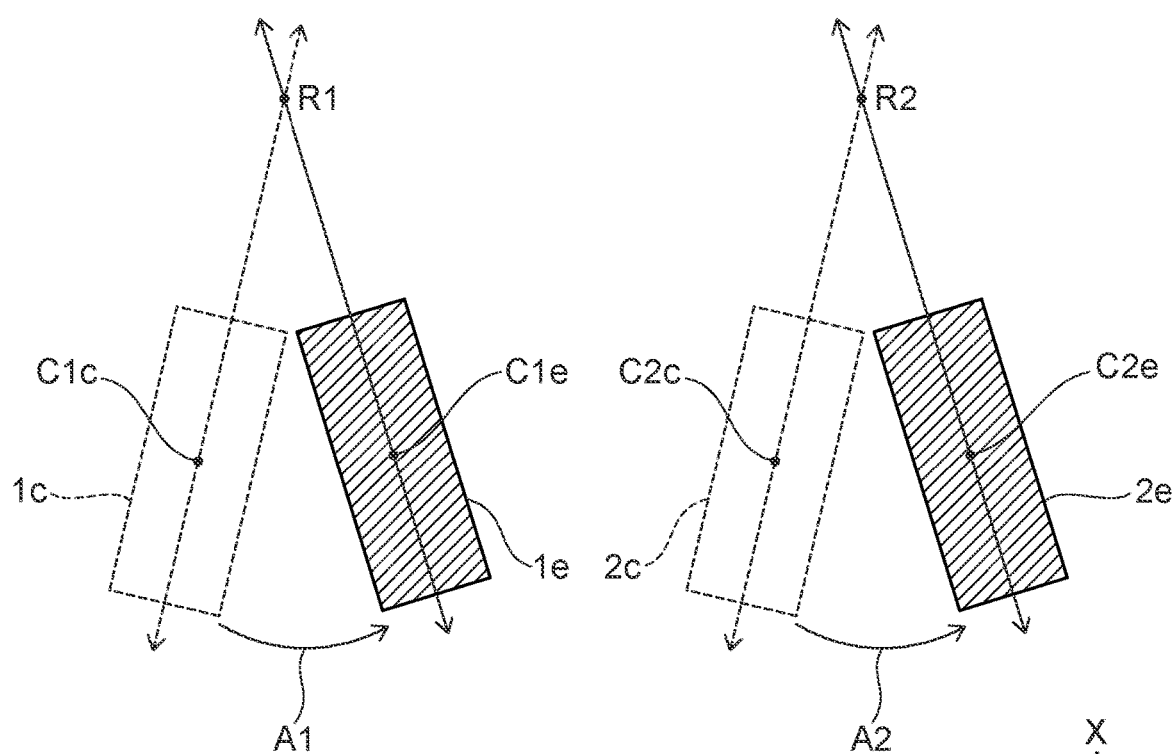
FIGS. 15A and 15B are schematic views showing the structure of the electronic component according to the second embodiment.

FIGS. 15A and 15B are schematic views showing the structure of the electronic component according to the second embodiment.

FIG. 15A shows the cross-sectional shapes of the first extension portion 1c and the first bonding portion 1e. The first extension portion 1c is illustrated by a broken line. In the electronic component 100a, in the Z-direction, the center C1c in the longitudinal direction LD1 of the first extension portion 1c is shifted from the center C1e in the longitudinal direction LD1 of the first bonding portion 1e. A rotation center R1 of the twist of the first interference portion 1d is outside the first interference portion 1d. Therefore, the position of the end portion in the longitudinal direction LD1 of the first lead 1 is greatly changed as shown by arrow A1.

FIG. 15B shows the cross-sectional shapes of the second extension portion 2c and the second bonding portion 2e. The second extension portion 2c is illustrated by a broken line. For the second lead 2 as well, similarly to the first lead 1, in the Z-direction, the center C2c in the longitudinal direction LD2 of the second extension portion 2c is shifted from the center C2e in the longitudinal direction LD2 of the second bonding portion 2e. A rotation center R2 of the twist of the second interference portion 2d is outside the second interference portion 2d. Therefore, the position of the end portion in the longitudinal direction LD2 of the second lead 2 is greatly changed as shown by arrow A2.

Figure 16:
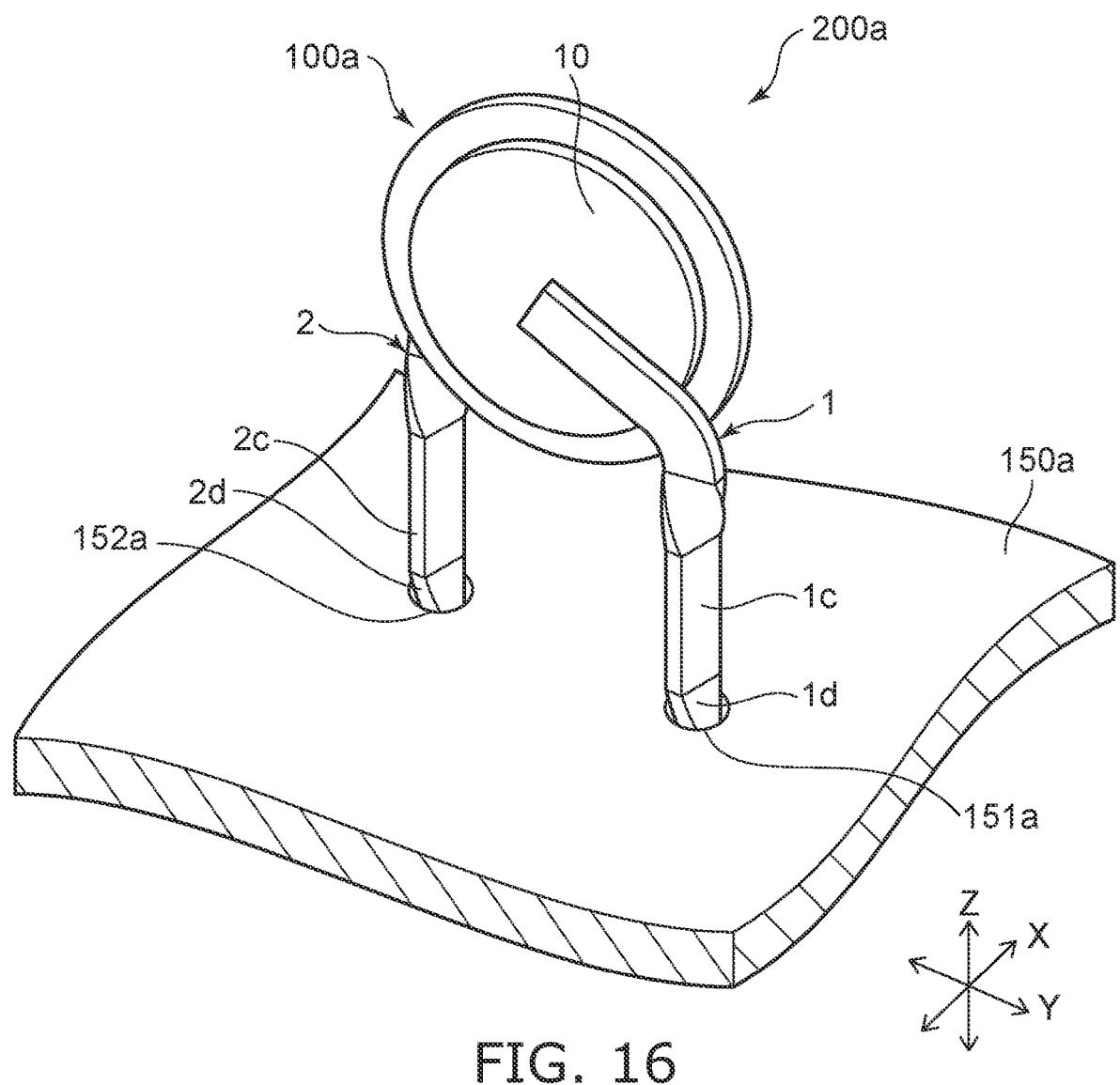
FIG. 16 is a perspective view showing an electronic device according to the second embodiment.
Figure 17:
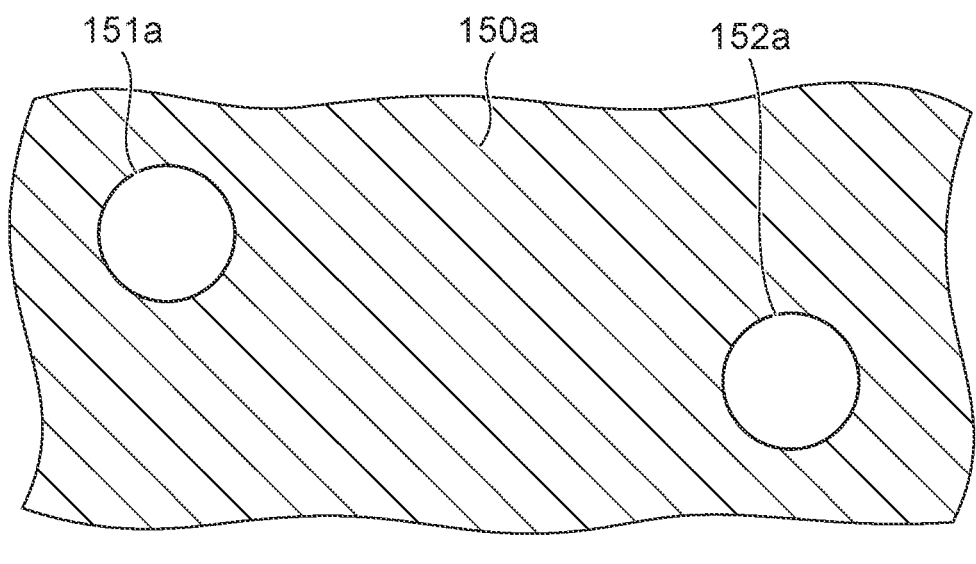
FIG. 17 is a plan view showing the substrate of the electronic device according to the second embodiment.

FIG. 16 is a perspective view showing an electronic device according to the second embodiment. FIG. 17 is a plan view showing the substrate of the electronic device according to the second embodiment.

As shown in FIG. 16, the electronic device 200a according to the second embodiment includes the electronic component 100a and a substrate 150a. The first and second bonding portions 1e and 2e of the electronic component 100a are respectively inserted into holes 151a and 152a of the substrate 150a and are bonded with wiring on the substrate by solder. The solder and the wiring are not illustrated in FIG. 16.

As shown in FIG. 17, the holes 151a and 152a are circular at the X-Y plane. For example, the shapes in the X-Y plane of the holes 151a and 152a are substantially perfect circles.

Figure 18A:
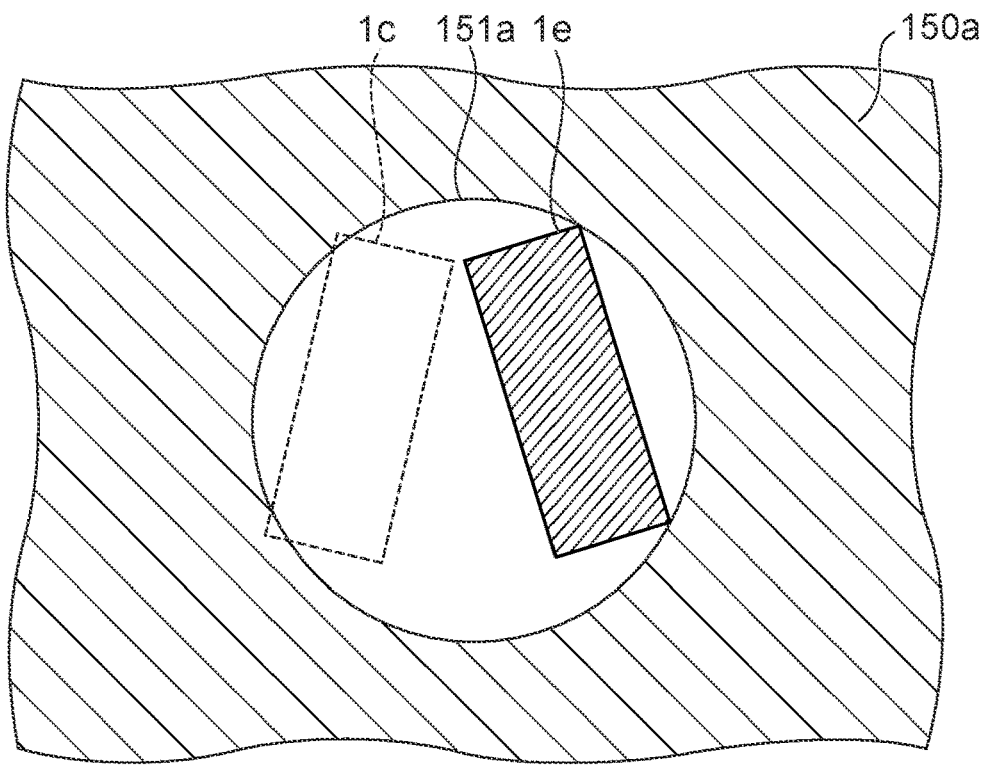
FIGS. 18A and 18B are plan views showing the electronic device according to the second embodiment.
Figure 18B:
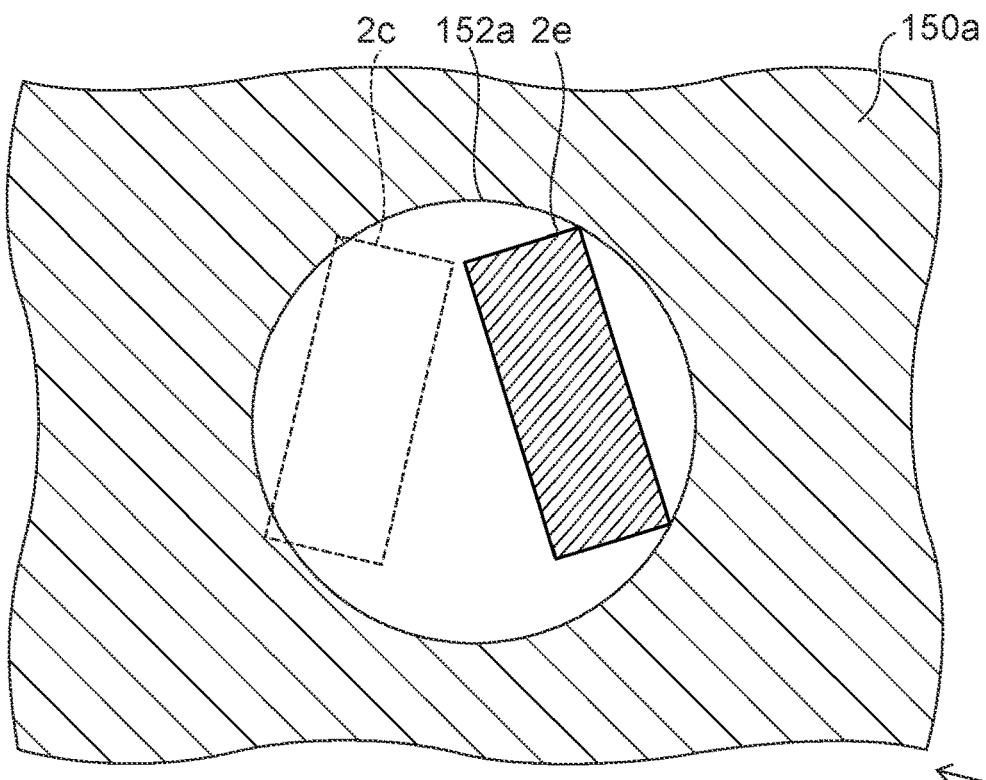

FIGS. 18A and 18B are plan views showing the electronic device according to the second embodiment. FIG. 18A corresponds to an X-Y cross-sectional view passing through the first bonding portion 1e and the substrate 150a. FIG. 18B corresponds to an X-Y cross-sectional view passing through the second bonding portion 2e and the substrate 150a.

As shown in FIG. 18A, a portion of the first extension portion 1c overlaps the substrate 150a outside the hole 151a when viewed along the Z-direction. In other words, the first interference portion 1d interferes with the edge of the hole 151a. Similarly, as shown in FIG. 18B, a portion of the second extension portion 2c overlaps the substrate 150a outside the hole 152a when viewed along the Z-direction. The second interference portion 2d interferes with the edge of the hole 152a.

Advantages of the second embodiment will now be described.

Other than the flattened shapes shown in FIGS. 12A to 12C, the shapes of the holes into which the first bonding portion 1e and the second bonding portion 2e are inserted may be circular as shown in FIG. 17. Compared to flattened holes, circular holes are easy to form. Also, there are cases where a metal foil is located at the periphery of the hole. Compared to a metal foil that is located along a circular hole, the metal foil easily delaminates when the metal foil is located along a flattened hole. Therefore, from the perspective of the reliability and the ease of manufacture, a circular hole is more favorable than a flattened hole.

Figure 19A:
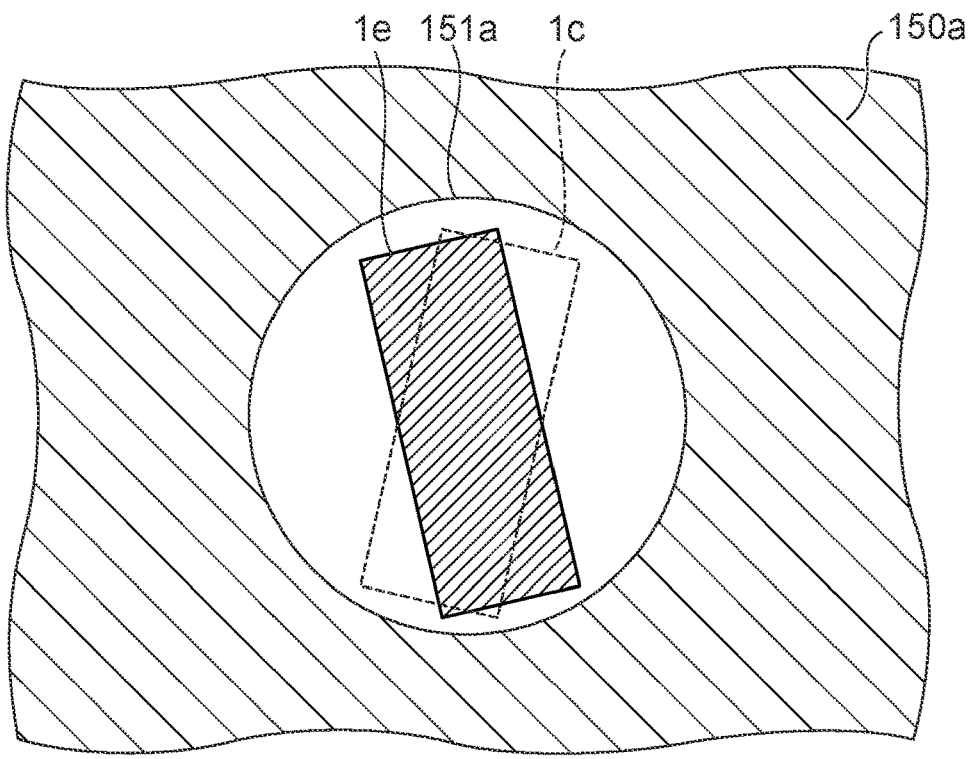
FIGS. 19A and 19B are plan views showing an electronic device according to a reference example.
Figure 19B:
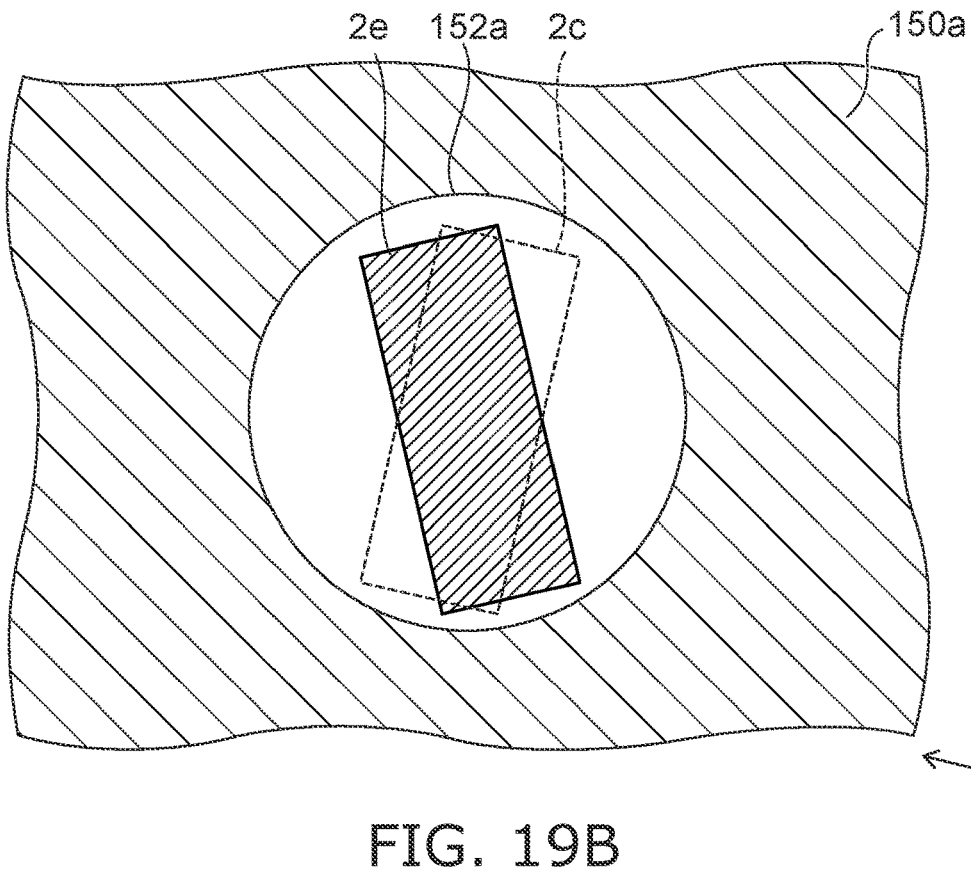

FIGS. 19A and 19B are plan views showing an electronic device according to a reference example.

When the holes are circular, the first interference portion 1d and the second interference portion 2d do not easily interfere with the substrate. FIGS. 19A and 19B show the electronic component 100 mounted to the substrate 150a that has circular holes. In such a case, as shown in FIGS. 19A and 19B, the first bonding portion 1e and the first extension portion 1c undesirably pass through the hole 151a; and the second bonding portion 2e and the second extension portion 2c undesirably pass through the hole 152a. The first interference portion 1d and the second interference portion 2d do not interfere with the substrate 150a.

For this problem, in the electronic component 100a according to the second embodiment, the rotation center of the twist of the first interference portion 1d is positioned outside the first interference portion 1d. Thereby, as shown in FIG. 18A, a portion of the first extension portion 1c is positioned outside the hole 151a; and the first interference portion 1d can be caused to interfere with the substrate 150a. Also, the rotation center of the twist of the second interference portion 2d is positioned outside the second interference portion 2d. Thereby, as shown in FIG. 18B, a portion of the second extension portion 2c is positioned outside the hole 152a; and the second interference portion 2d can be caused to interfere with the substrate 150a.

Although the rotation center of the twist of the first interference portion 1d may be positioned inside the first interference portion 1d, it is favorable for the rotation center to be positioned outside the first interference portion 1d. Compared to when the rotation center of the twist of the first interference portion 1d is positioned inside the first interference portion 1d, the angle of the twist necessary for the interference can be reduced when the rotation center is positioned outside the first interference portion 1d. By reducing the angle of the twist, the reduction of the strength of the first interference portion 1d can be suppressed. Similarly, compared to when the rotation center of the twist of the second interference portion 2d is positioned inside the second interference portion 2d, the angle of the twist necessary for the interference can be reduced when the rotation center is positioned outside the second interference portion 2d; and the reduction of the strength of the second interference portion 2d can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. An electronic component, comprising:
   an element including a first electrode and a second electrode;
   a first lead electrically connected with the first electrode, the first lead having a flattened cross section; and
   a second lead electrically connected with the second electrode,
   the first lead including
      a first connection portion connected with the first electrode,
      a first bonding portion configured to be bonded with a substrate, the first bonding portion extending in an extension direction perpendicular to a first counter direction, the first counter direction connecting the first electrode and the second electrode, and
      a first extension portion located between the first connection portion and the first bonding portion, the first extension portion extending in the extension direction,
   a longitudinal direction of the first bonding portion being different from a longitudinal direction of the first extension portion,
   the longitudinal direction of the first extension portion crossing a second counter direction,
   the second counter direction connecting the first lead and the second lead.

2. The component according to claim 1, wherein the longitudinal direction of the first extension portion is different from a longitudinal direction of the first connection portion.

3. The component according to claim 2, wherein
   the first lead further includes a first intermediate portion located between the first connection portion and the first extension portion,
   the first intermediate portion is twisted to cause a change of a longitudinal direction of the first lead, and
   the change of the longitudinal direction at the first intermediate portion is less than 90 degrees.

4. The component according to claim 3, wherein
   the first lead further includes a first interference portion located between the first extension portion and the first bonding portion,
   the first interference portion is twisted to cause a change of the longitudinal direction of the first lead, and
   an angle of the change of the longitudinal direction at the first interference portion is less than an angle of the change of the longitudinal direction at the first intermediate portion.

5. The component according to claim 4, wherein
   a rotation center of the twist of the first interference portion is positioned outside the first interference portion.

6. The component according to claim 1, wherein
   a longitudinal-direction center of the first bonding portion overlaps a longitudinal-direction center of the first extension portion in the extension direction.

7. The component according to claim 1, wherein
   the second lead includes
      a second connection portion connected with the second electrode,
      a second bonding portion configured to be bonded with the substrate, the second bonding portion extending in the extension direction, and
      a second extension portion located between the second connection portion and the second bonding portion, the second extension portion extending in the extension direction,
   a longitudinal direction of the second bonding portion is different from a longitudinal direction of the second extension portion, and
   the longitudinal direction of the second extension portion crosses the second counter direction.

8. The component according to claim 1, wherein
   an angle between the longitudinal direction of the first extension portion and a direction orthogonal to the second counter direction is less than 20 degrees.

9. The component according to claim 1, wherein
   the longitudinal direction of the first extension portion is perpendicular to the second counter direction.

10. An electronic device, comprising:
    a substrate to which the component according to claim 1 is mounted.

* * * * *